US012812646B2

(12) United States Patent
Awad et al.

(10) Patent No.: US 12,812,646 B2
(45) Date of Patent: Nov. 24, 2026

(54) TRANSMISSION / RECEPTION OF AN UPLINK SIGNAL VIA A WIRELESS ACCESS INTERFACE

(71) Applicant: Sony Group Corporation, Tokyo (JP)

(72) Inventors: Yassin Aden Awad, Basingstoke (GB); Samuel Asangbeng Atungsiri, Basingstoke (GB); Martin Warwick Beale, Basingstoke (GB); Shin Horng Wong, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 520 days.

(21) Appl. No.: 18/280,470

(22) PCT Filed: Feb. 4, 2022

(86) PCT No.: PCT/EP2022/052703
§ 371 (c)(1),
(2) Date: Feb. 8, 2024

(87) PCT Pub. No.: WO2022/194444
PCT Pub. Date: Sep. 22, 2022

(65) Prior Publication Data

US 2025/0324422 A1 Oct. 16, 2025

(30) Foreign Application Priority Data

Mar. 18, 2021 (EP) .................................... 21163550

(51) Int. Cl.
*H04W 72/21* (2023.01)
*H04L 5/00* (2006.01)
*H04W 76/27* (2018.01)

(52) U.S. Cl.
CPC ........... *H04W 72/21* (2023.01); *H04L 5/0048* (2013.01); *H04W 76/27* (2018.02)

(58) Field of Classification Search
CPC .... H04W 72/21; H04W 76/27; H04L 5/0023; H04L 5/0048; H04L 5/0051; H04L 5/0091
See application file for complete search history.

(56) References Cited

U.S. PATENT DOCUMENTS

2012/0176995 A1* 7/2012 Parkvall ............ H04W 74/0833 370/329
2019/0320457 A1 10/2019 Maaref
(Continued)

FOREIGN PATENT DOCUMENTS

CN 106105303 A 11/2016

OTHER PUBLICATIONS

3rd Generation Partnership Project, "Technical Specification Group Radio Access Network; NR; Physical channels and modulation (Release 16)", 3GPP TS 38.211, vol. 16, No. 4, retrieved from Internet on Mar. 12, 2021, pp. 1-133.
(Continued)

*Primary Examiner* — Wayne H Cai
(74) *Attorney, Agent, or Firm* — XSENSUS LLP

(57) ABSTRACT

A method of operating a communications device for transmitting signals to and/or receiving signals from a wireless communications network via a wireless access interface is provided. The method comprises determining that the communications device has uplink data to transmit to the wireless communications network, constructing an uplink signal comprising the uplink data by initialising one or more characteristics of the uplink signal, wherein the one or more characteristics of the uplink signal are associated with a reference value known to each of the communications device and the wireless communications network, and transmitting the uplink signal to the wireless communications network.

8 Claims, 13 Drawing Sheets

(56) References Cited

U.S. PATENT DOCUMENTS

| | | | | |
|---|---|---|---|---|
| 2020/0154423 | A1 | 5/2020 | Wang | |
| 2020/0205189 | A1 | 6/2020 | Maaref et al. | |
| 2020/0213901 | A1* | 7/2020 | Yoshimoto | H04L 5/0048 |
| 2020/0235900 | A1 | 7/2020 | Yang et al. | |
| 2020/0404682 | A1* | 12/2020 | Zhou | H04W 72/23 |
| 2023/0156804 | A1* | 5/2023 | Ye | H04W 74/0833 370/329 |
| 2024/0080851 | A1* | 3/2024 | Khoshnevisan | H04B 7/0626 |

OTHER PUBLICATIONS

3rd Generation Partnership Project, "Technical Specification Group Radio Access Network; Solutions for NR to support non-terrestrial networks (NTN) (Release 16)", 3GPP TR 38.821, vol. 16, Dec. 2019, pp. 1-140.

3rd Generation Partnership Project, "Technical Specification Group Radio Access Network; Study on Scenarios and Requirements for Next Generation Access Technologies; (Release 14)", 3GPP TR 38.913, vol. 14, No. 2, Mar. 2017, pp. 1-38.

Holma et al., "LTE for UMTS-OFDMA and SC-FDMA Based Radio Access", John Wiley & Sons Ltd., 2009, 450 pages.

Moderator (Ericsson), "Feature lead summary#1 on timing relationship enhancements", 3GPP TSG-RAN WG1 Meeting #104-e, R1-2101793, Jan. 25-Feb. 5, 2021, 42 pages.

Mediatek Inc., "New Study WID on NB-IoT/eTMC support for NTN", 3GPP TSG RAN Meeting #86, RP-193235, Dec. 9-31, 2019, 04 pages.

Thales, "Solutions for NR to support non-terrestrial networks (NTN)", 3GPP TSG RAN meeting #90-e, RP-202908, Dec. 7-11, 2020, 10 pages.

3rd Generation Partnership Project, "Technical Specification Group Radio Access Network; Study on New Radio (NR) to support non-terrestrial networks (Release 15)", 3GPP TR 38.811, vol. 15, No. 4, Sep. 2020, pp. 1-127.

3rd Generation Partnership Project, "Technical Specification Group Radio Access Network; Evolved Universal Terrestrial Radio Access (E-UTRA); Physical channels and modulation (Release 16)", 3GPP TS 36.211, vol. 16, No. 4, Dec. 2020, pp. 1-249.

International Search Report and Written Opinion mailed on Jun. 10, 2022, received for PCT Application PCT/EP2022/052703, filed on Feb. 4, 2022, 14 pages.

3rd Generation Partnership Project (3GPP), et al., "NR; Physical Channels and Modulation," 3GPP TS 38.211 V16.4.0, Release 16, Technical Specification, Dec. 2020, 3rd Generation Partnership.

3rd Generation Partnership Project (3GPP), et al., "Solutions for NR to Support Non-Terrestrial Networks (NTN)," 3GPP TR 38.821 V16.0.0, Release 16, Technical Report, Dec. 2019, 3rd Generation Partnership Project.

* cited by examiner

TRANSMISSION / RECEPTION OF AN UPLINK SIGNAL VIA A WIRELESS ACCESS INTERFACE

CROSS-REFERENCE TO RELATED APPLICATIONS

The present application is based on PCT filing PCT/EP2022/052703, filed Feb. 4, 2022, and claims priority from European Patent Application No. 21163550.3, filed Mar. 18, 2021, the contents of each are hereby incorporated by reference.

BACKGROUND

Field of Disclosure

The present disclosure relates generally to wireless communications networks, and specifically to methods and devices for ensuring that transmitting and receiving devices are aligned with respect to the timing and the characteristics of a transmitted signal.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these and future networks, i.e. geographic locations where access to the networks is possible, may be expected to increase ever more rapidly.

Current and future wireless communications networks are expected to routinely and efficiently support communications with a wider range of devices associated with a wider range of data traffic profiles and types than previously developed systems are optimised to support. For example it is expected that future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for more advanced wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes so-called "non-terrestrial networks", or NTN for short. 3GPP has proposed in Release 15 of the 3GPP specifications to develop technologies for providing coverage by means of one or more antennas mounted on airborne or space-borne vehicles [1].

Non-terrestrial networks may provide service in areas that cannot be covered by terrestrial cellular networks (i.e. those where coverage is provided by means of land-based antennas), such as isolated or remote areas, on board aircraft or vessels) or may provide enhanced service in other areas. The expanded coverage that may be achieved by means of non-terrestrial networks may provide service continuity for machine-to-machine (M2M) or 'internet of things' (IoT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

The use of different types of network infrastructure equipment and requirements for coverage enhancement give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method of operating a communications device for transmitting signals to and/or receiving signals from a wireless communications network via a wireless access interface. The method comprises determining that the communications device has uplink data to transmit to the wireless communications network, constructing an uplink signal comprising the uplink data by initialising one or more characteristics of the uplink signal, wherein the one or more characteristics of the uplink signal are associated with a reference value known to each of the communications device and the wireless communications network, and transmitting the uplink signal to the wireless communications network.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
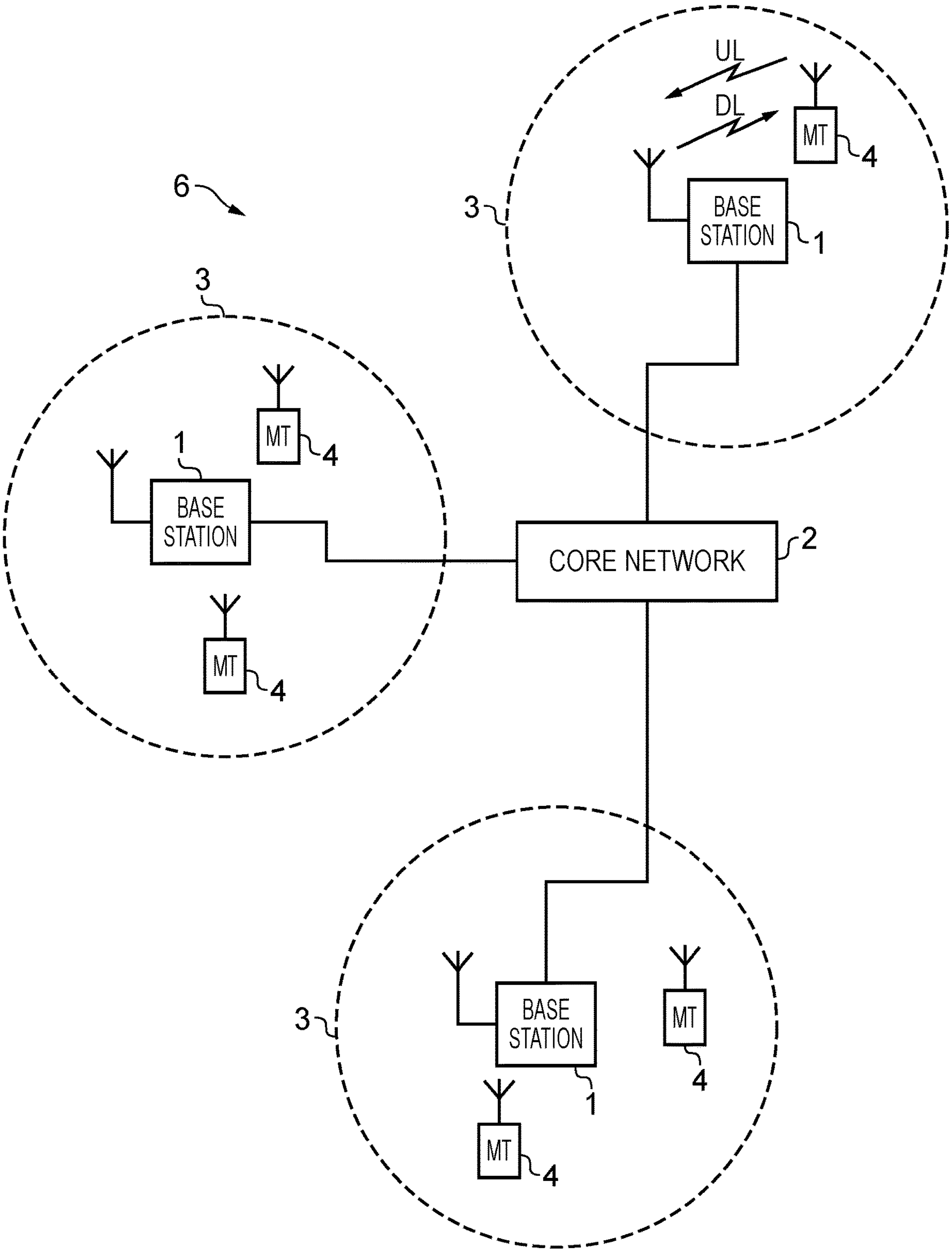
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4. Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink (DL). Data is transmitted from communications devices 4 to the base stations 1 via a radio uplink (UL). The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth. Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
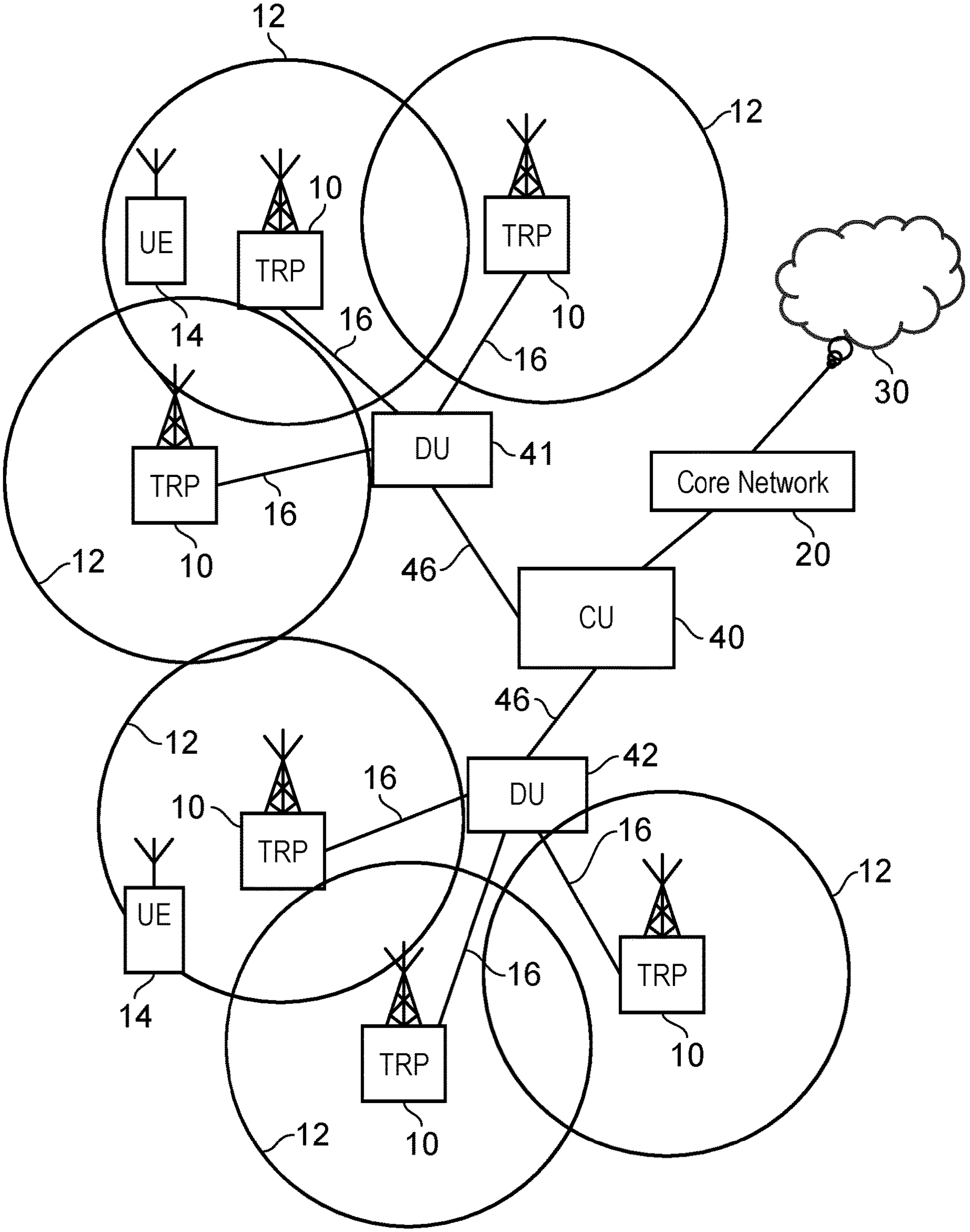
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 12 via one of the distributed units/TRPs 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus, certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
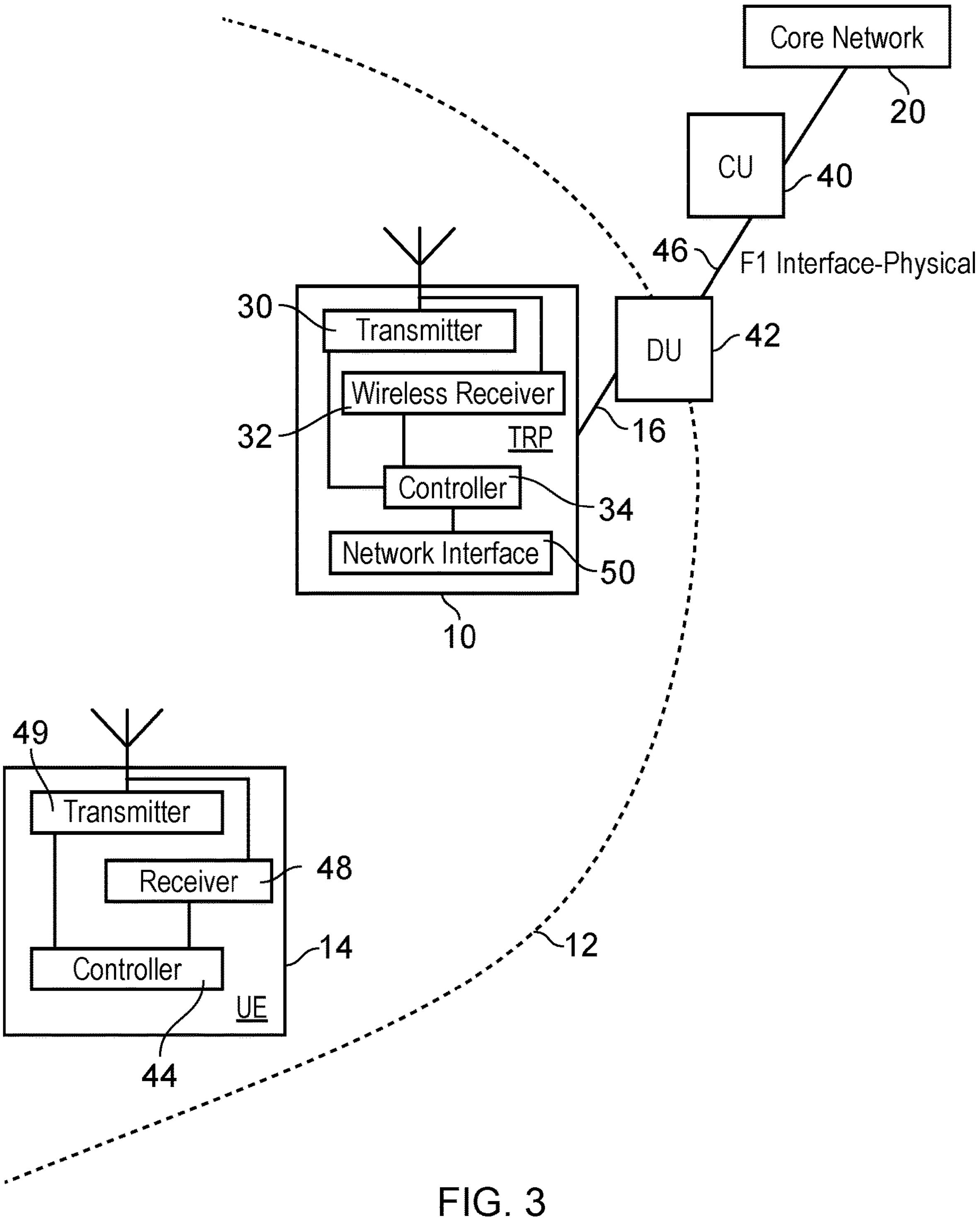
FIG. 3 is a schematic block diagram of an example infrastructure equipment and communications device which may be configured to operate in accordance with certain embodiments of the present disclosure.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The transmitters, the receivers and the controllers are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment/TRP/base station as well as the UE/communications device will in general comprise various other elements associated with its operating functionality.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface, and may be formed from a fibre optic or other wired or wireless high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP 10 to the DU 42 and the F1 interface 46 from the DU 42 to the CU 40.

Non-Terrestrial Networks (NTNs)

Figure 4:
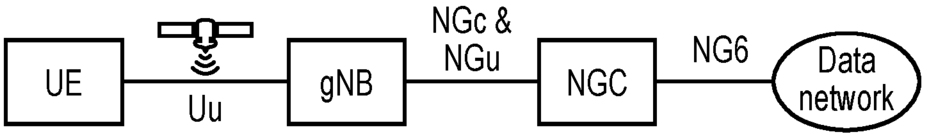
FIG. 4 is reproduced from [1], and illustrates a first example of a non-terrestrial network (NTN) featuring an access networking service based on a satellite/aerial platform with a bent pipe payload.
Figure 5:
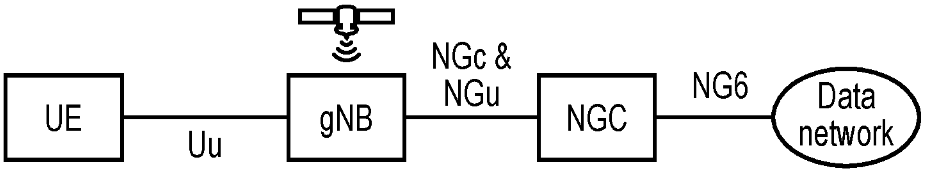
FIG. 5 is reproduced from [1], and illustrates a second example of an NTN featuring an access networking service based on a satellite/aerial platform that incorporates a gNodeB.

An overview of NR-NTN can be found in [1], and much of the following wording, along with FIGS. 4 and 5, has been reproduced from that document as a way of background.

As a result of the wide service coverage capabilities and reduced vulnerability of space/airborne vehicles to physical attacks and natural disasters, Non-Terrestrial Networks are expected to:

- foster the roll out of 5G service in un-served areas that cannot be covered by terrestrial 5G network (isolated/remote areas, on board aircrafts or vessels) and underserved areas (e.g. sub-urban/rural areas) to upgrade the performance of limited terrestrial networks in cost effective manner;
- reinforce the 5G service reliability by providing service continuity for M2M/IoT devices or for passengers on board moving platforms (e.g. passenger vehicles-aircraft, ships, high speed trains, bus) or ensuring service availability anywhere especially for critical communications, future railway/maritime/aeronautical communications; and to
- enable 5G network scalability by providing efficient multicast/broadcast resources for data delivery towards the network edges or even user terminal.

The benefits relate to either Non-Terrestrial Networks operating alone or to integrated terrestrial and Non-Terrestrial networks. They will impact at least coverage, user bandwidth, system capacity, service reliability or service availability, energy consumption and connection density. A role for Non-Terrestrial Network components in the 5G system is expected for at least the following verticals: transport, Public Safety, Media and Entertainment, eHealth, Energy, Agriculture, Finance and Automotive. It should also be noted that the same NTN benefits apply to other technologies such as 4G and/or LTE technologies, and that while NR is sometimes referred to in the present disclosure, the teachings and techniques presented herein are equally applicable to other technologies such as 4G and/or LTE.

FIG. 4 illustrates a first example of an NTN architecture based on a satellite/aerial platform with a bent pipe payload, meaning that the signal received from the UE is simply reflected and sent back down to Earth by the satellite/aerial platform, with only frequency or amplification changing; i.e. acting like a pipe with a u-bend. In this example NTN, the satellite or the aerial platform will therefore relay a "satellite friendly" NR (or LTE) signal between the gNodeB (or eNodeB) and UEs in a transparent manner.

FIG. 5 illustrates a second example of an NTN architecture based on a satellite/aerial platform comprising a gNodeB (or eNodeB in the examples of the present disclosure) which may be referred to as non-terrestrial infrastructure equipment. In this example NTN, the satellite or aerial platform carries a full or part of a gNodeB/eNodeB to generate or receive an NR (or LTE) signal to/from the UEs. For example, in addition to frequency conversion and amplification, the satellite/aerial platform may also decode a received signal. This requires the satellite or aerial platform to have sufficient on-board processing capabilities to be able to include a gNodeB or eNodeB functionality.

Figure 6:
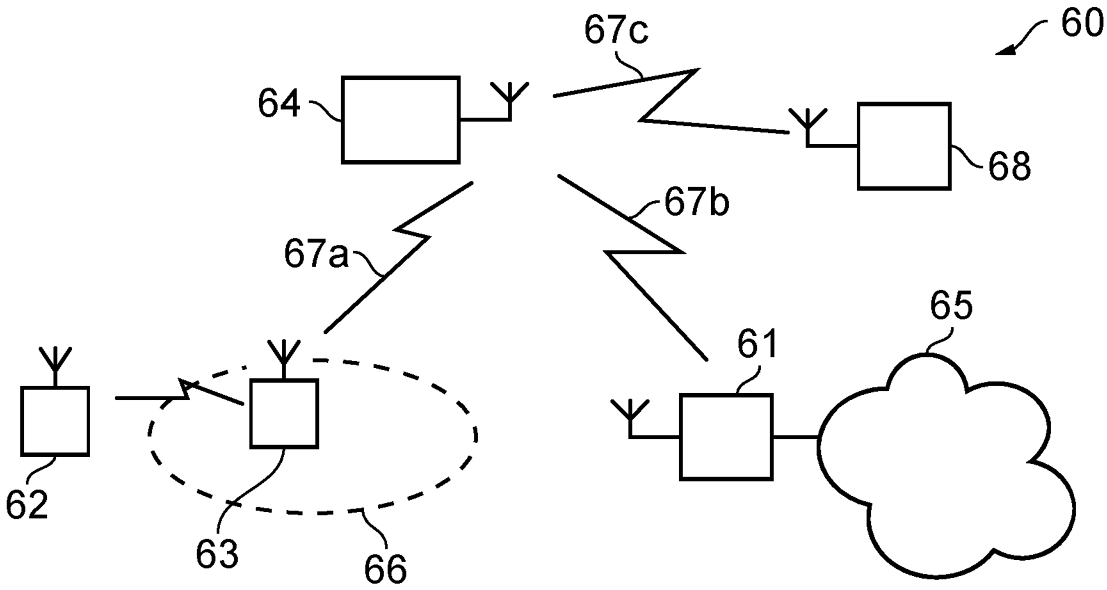
FIG. 6 schematically shows an example of a wireless communications system comprising an NTN part and a terrestrial network (TN) part which may be configured to operate in accordance with embodiments of the present disclosure.

FIG. 6 schematically shows an example of a wireless communications system 60 which may be configured to operate in accordance with embodiments of the present disclosure. The wireless communications system 60 in this example is based broadly around an LTE-type or 5G-type architecture. Many aspects of the operation of the wireless communications system/network 60 are known and understood and are not described here in detail in the interest of brevity. Operational aspects of the wireless communications system 60 which are not specifically described herein may be implemented in accordance with any known techniques, for example according to the current LTE standards or the current 5G standards.

The wireless communications system 60 comprises a core network part 65 (which may be a 4G core network or a 5G core network) in communicative connection with a radio network part. The radio network part comprises a base station (g-node B) 61 connected to a non-terrestrial network part 64. The non-terrestrial network part 64 may be an example of infrastructure equipment. Alternatively, or in addition, the non-terrestrial network part 64 may be mounted on a satellite vehicle or on an airborne vehicle.

The non-terrestrial network part 64 may communicate with a communications device 63, located within a cell 66, by means of a wireless access interface provided by a wireless communications link 67*a*. For example, the cell 66 may correspond to the coverage area of a spot beam generated by the non-terrestrial network part 64. The boundary of the cell 66 may depend on an altitude of the non-terrestrial network part 64 and a configuration of one or more antennas of the non-terrestrial network part 64 by which the non-terrestrial network part 64 transmits and receives signals on the wireless access interface.

The non-terrestrial network part 64 may be a satellite in an orbit with respect to the Earth, or may be mounted on such a satellite. For example, the satellite may be in a geo-stationary earth orbit (GEO) such that the non-terrestrial network part 64 does not move with respect to a fixed point on the Earth's surface. The geo-stationary earth orbit may be approximately 36,786 km above the Earth's equator. The satellite may alternatively be in a low-earth orbit (LEO), in which the non-terrestrial network part 64 may complete an orbit of the Earth relatively quickly, thus providing moving cell coverage. Alternatively, the satellite may be in a non-geostationary orbit (NGSO), so that the non-terrestrial network part 64 moves with respect to a fixed point on the Earth's surface. The non-terrestrial network part 64 may be an airborne vehicle such as an aircraft, or may be mounted on such a vehicle. The airborne vehicle (and hence the non-terrestrial network part 64) may be stationary with respect to the surface of the Earth or may move with respect to the surface of the Earth.

In FIG. 6, the terrestrial station 61 is shown as ground-based, and connected to the non-terrestrial network part 64 by means of a wireless communications link 67*b*. The non-terrestrial network part 64 receives signals representing downlink data transmitted by the base station 61 on the wireless communications link 67*b* and, based on the received signals, transmits signals representing the downlink data via the wireless communications link 67*a* providing the wireless access interface for the communications device 63. Similarly, the non-terrestrial network part 64 receives signals representing uplink data transmitted by the communications device 63 via the wireless access interface comprising the wireless communications link 67*a* and transmits signals representing the uplink data to the terrestrial station 61 on the wireless communications link 67*b*. The wireless communications links 67*a*, 67*b* may operate at a same frequency, or may operate at different frequencies.

The extent to which the non-terrestrial network part 64 processes the received signals may depend upon a processing capability of the non-terrestrial network part 64. For example, the non-terrestrial network part 64 may receive signals representing the downlink data on the wireless communication link 67*b*, amplify them and (if needed) re-modulate onto an appropriate carrier frequency for onwards transmission on the wireless access interface provided by the wireless communications link 67*a*. Alternatively, the non-terrestrial network part 64 may be configured to decode the signals representing the downlink data received on the wireless communication link 67*b* into un-encoded downlink data, re-encode the downlink data and modulate the encoded downlink data onto the appropriate carrier frequency for onwards transmission on the wireless access interface provided by the wireless communications link 67*a*.

The non-terrestrial network part 64 may be configured to perform some of the functionality conventionally carried out by a base station (e.g. a gNodeB or an eNodeB), such as base station 1 as shown in FIG. 1. In particular, latency-sensitive functionality (such as acknowledging a receipt of the uplink data, or responding to a RACH request) may be performed by the non-terrestrial network part 64 partially implementing some of the functions of a base station.

As mentioned above, a base station may be co-located with the non-terrestrial network part 64; for example, both may be mounted on the same satellite vehicle or airborne vehicle, and there may be a physical (e.g. wired, or fibre optic) connection on board the satellite vehicle or airborne vehicle, providing the coupling between the terrestrial station 61 and the non-terrestrial network part 64. In such co-located arrangements, a wireless communications feeder link between the terrestrial station 61 and another terrestrial station (not shown) may provide connectivity between the terrestrial station 61 (co-located with the non-terrestrial network part 64) and the core network part 65.

The terrestrial station 61 may be a NTN Gateway that is configured to transmit signals to the non-terrestrial network part 64 via the wireless communications link 67*b* and to communicate with the core network part 65. That is, in some examples the terrestrial station 61 may not include base station functionality. For example, if the base station is co-located with the non-terrestrial network part 64, as described above, the terrestrial station 61 does not implement base station functionality. In other examples, the base station may be co-located with the NTN Gateway in the terrestrial station 61, such that the terrestrial station 61 is capable of performing base station (e.g. gNodeB or eNodeB) functionality.

In some examples, even if the base station is not co-located with the non-terrestrial network part 64 (such that the base station functionality is implemented by a ground-based component), the terrestrial station 61 may not necessarily implement the base station functionality. In other words, the base station (e.g. gNodeB or eNodeB) may not be co-located with the terrestrial station 61 (NTN Gateway). In this manner, the terrestrial station 61 (NTN Gateway) transmits signals received from the non-terrestrial network part 64 to a base station (not shown in FIG. 6). In such an example, the base station (e.g. gNodeB or eNodeB) may be considered as being part of core network part 65, or may be separate (not shown in FIG. 6) from the core network part 65 and located logically between the terrestrial station 61 (NTN Gateway) and the core network part 65.

In some cases, the communications device 63 shown in FIG. 6 may be configured to act as a relay node. That is, it may provide connectivity to one or more terminal devices such as the terminal device 62. When acting as a relay node, the communications device 63 transmits and receives data to and from the terminal device 62, and relays it, via the non-terrestrial network part 64 to the terrestrial station 61. The communications device 63, acting as a relay node, may thus provide connectivity to the core network part 65 for terminal devices which are within a transmission range of the communications device 63.

In some cases, the non-terrestrial network part 64 is also connected to a ground station 68 via a wireless link 67*c*. The ground station may for example be operated by the satellite operator (which may be the same as the mobile operator for the core and/or radio network or may be a different operator) and the link 67*c* may be used as a management link and/or to exchange control information. In some cases, once the non-terrestrial network part 64 has identified its current position and velocity, it can send position and velocity information to the ground station 68. The position and velocity information may be shared as appropriate, e.g. with one or more of the UE 63, terrestrial station 61 and base station, for configuring the wireless communication accordingly (e.g. via links 67*a* and/or 67*b*).

It will be apparent to those skilled in the art that many scenarios can be envisaged in which the combination of the communications device 63 and the non-terrestrial network part 64 can provide enhanced service to end users. For example, the communications device 63 may be mounted on a passenger vehicle such as a bus or train which travels through rural areas where coverage by terrestrial base stations may be limited. Terminal devices on the vehicle may obtain service via the communications device 63 acting as a relay, which communicates with the non-terrestrial network part 64.

A challenge of conventional cellular communications techniques may be the relatively high rate at which cell changes occur for the communications device 63 obtaining service from one or more non-terrestrial network parts. For example, where the non-terrestrial network part 64 is mounted on a LEO satellite, the non-terrestrial network part 64 may complete an orbit of the Earth in around 90 minutes; the coverage of a cell generated by the non-terrestrial network part 64 will move very rapidly, with respect to a fixed observation point on the surface of the Earth. Similarly, it may be expected in some cases that the communications device 63 may be mounted on an airborne vehicle itself, having a ground speed of several hundreds of kilometres per hour.

A study has been completed by 3GPP on solutions for NR to support NTN, as detailed in [3]. This study [3] focuses on use cases for satellite access in 5G and service requirements, as well as on evaluating solutions and impacts on RAN protocols and architecture. The study resulted in a new work item [4] that has already been started in RAN working groups to specify the enhancements identified for NR, especially for satellite access via transparent payload LEO and GEO satellites with implicit compatibility to support high altitude platform stations (HAPS) and air to ground (ATG) scenarios.

In addition, 3GPP initiated a new study item [5] for deploying narrowband internet of things (NB-IoT)/enhanced machine type communications (eMTC) over NTN, with the following justifications as detailed in [5]:

- IoT operation is critical in remote areas with low/no cellular connectivity for many different industries, including for example:
  - Transportation (maritime, road, rail, air) & logistics;
  - Solar, oil & gas harvesting;
  - Utilities;
  - Farming;
  - Environment monitoring; and
  - Mining etc.; and
- From the objectives perspective, the study will address at least the following items:
  - Aspects related to random access procedure/signals [RAN1, RAN2];
  - Mechanisms for time/frequency adjustment including Timing Advance, and UL frequency compensation indication [RAN1, RAN2];
  - Timing offset related to scheduling and hybrid automatic repeat request acknowledgement (HARQ-ACK) feedback [RAN1, RAN2];
  - Aspects related to HARQ operation [RAN2, RAN1];
  - General aspects related to timers (e.g. scheduling requests (SR), discontinuous reception (DRX), etc.) [RAN2];
  - RAN2 aspects related to idle mode and connected mode mobility [RAN2];
    - Radio link failure (RLF)-based for NB-IoT;
    - Handover-based for eMTC;
  - System information enhancements [RAN2]; and
  - Tracking area enhancements [RAN2].

Timings in NTN

Figure 7:
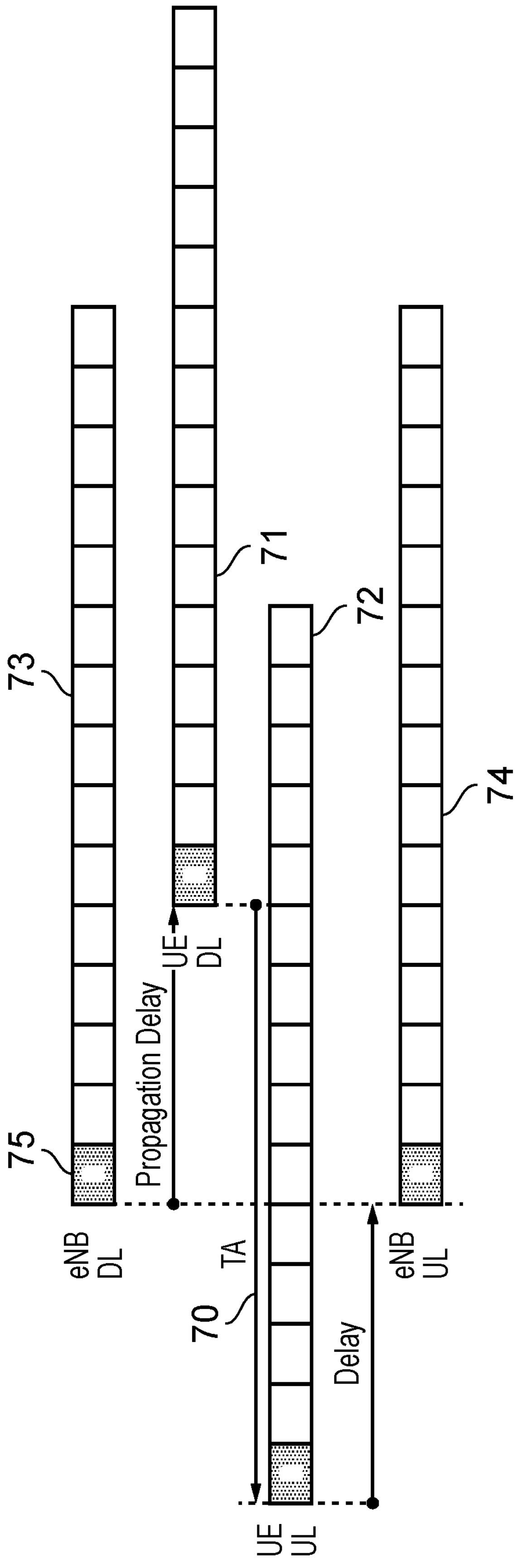
FIG. 7 is reproduced from [3], and illustrates an example of a large timing advance (TA) in NTN that results in a large offset between a user equipment's (UE's) downlink and uplink frame timing.

In terrestrial networks (TN), the propagation delays between the UE and the base station are very small; typically less than 1 ms. This delay can be tolerated by the cyclic prefix of each OFDM symbol, and/or can be handled by a timing advancement (TA) mechanism. However, the propagation delays in NTN are very long; from milliseconds to hundreds of milliseconds, depending on the altitude of the space-borne or airborne platforms, and on satellite type in NTN. Hence, if a UE applies a large TA (typically twice the one-way propagation delay) as in the legacy TN, there will be a large difference between the UE DL and UL frame timing as shown by FIG. 7, which is reproduced from [3]. As can be seen in FIG. 7, the large propagation delay between the UE and the eNodeB causes the UE's DL frame timing 71 to be shifted in time with respect to the eNB's DL frame timing 73 and causes its UL frame timing 72 to be shifted in time with respect to the eNB's UL frame timing 74. Due to the propagation delays, in order to align the UE's UL frame timing with the eNB's UL frame timing (which in FIG. 7 is shown as aligning with the eNB's DL frame timing 73) when the UE's UL frame structure arrives at the eNB after being subject to the propagation delay, a timing advance 70 is applied to the UE's UL frame timing 72. Hence, for a particular subframe n 75, in the example of FIG. 7, there is a timing difference of ten subframes between the position of n 75 in the UE's DL frame timing 71 and the UE's UL frame timing 72, where the timing difference corresponds to the timing advance 70 applied to the UE's UL frame timing.

One impact of such a difference between the UE DL and UL frame timings as illustrated by FIG. 7 is that a UE operating in accordance with dynamic grant procedures may be required to transmit its UL channels before even receiving a scheduling downlink control information (DCI) for the UL channels, which is clearly impossible in practice. Therefore, some changes are required to the current timing relationships at the physical layer as well as at higher layers in NR and LTE to support NTN. Some examples of such existing timing relationships for uplink channels include:

- For MTC:
  - The timing between scheduling DCI and corresponding physical uplink shared channel (PUSCH):
    - A UE upon detection of DCI at DL subframe n should perform PUSCH transmission in subframe n+k, where k is a subframe offset and is based on the numerology of the PUSCH. For frequency division duplexing (FDD), k=4, and for time division duplexing (TDD), k depends on TDD UL/DL;
  - The timing between scheduling DCI carrying a random access response (RAR) and the corresponding msg3 PUSCH:
    - A UE upon detection of RAR DCI at DL subframe n should perform msg3 PUSCH transmission in the first subframe of $n+k_1$, $k_1 \geq 6$ where a PUSCH resource is available;
  - The timing between scheduling DCI carrying a machine type communication (MTC) physical downlink control channel MPDCCH order and a corresponding physical random access channel (PRACH):
    - A UE upon detection of DCI carrying a physical downlink control channel (PDCCH) order at DL subframe n should perform PRACH transmission in the first subframe of $n+k_2$, $k_2 \geq 6$, where a PRACH resource is available;
  - The timing between scheduling activation DCI and corresponding UL semi-persistent scheduling (SPS) PUSCH:
    - For a PUSCH transmission starting in subframe $n+k_0$ without a corresponding MPDCCH, the UE shall perform the PUSCH transmission in subframe $n+k_0$ where $k_0=0$;
  - The timing between received physical downlink shared channel (PDSCH) and corresponding HARQ-ACK on a physical uplink control channel (PUCCH);
    - A UE upon detection of PDSCH at DL subframe n-k should perform HARQ-ACK transmission on PUCCH in subframe n. For FDD, k=4;
  - The timing between received MPDCCH and corresponding channel state information (CSI) on PUCCH:
    - A UE upon detection of DCI triggering aperiodic CSI report at DL subframe n should perform aperiodic CSI transmission on PUCCH in subframe n+k. For FDD, k=4; and The timing between received DCI triggering aperiodic sounding reference symbols (SRS):

A UE upon detection of DCI triggering aperiodic SRS (Type 1 SRS) at DL subframe n should perform aperiodic SRS transmission in the first subframe satisfying n+k, k≥4; and For NB-IoT:

The timing between scheduling DCI and corresponding narrowband PUSCH (NPUSCH):

A UE upon detection of DCI at DL subframe n should perform NPUSCH transmission at the end of $n+k_0$, where $k_0$ is a slot offset and is based on the numerology of the NPUSCH;

The timing between scheduling DCI carrying RAR and corresponding msg3 NPUSCH:

A UE upon detection of RAR grant at DL subframe n should perform NPUSCH transmission at the end of $n+k_0$; and The timing between received NPDSCH and corresponding HARQ-ACK on NPUSCH A UE upon detection of NPDSCH at DL subframe n should perform HARQ-ACK transmission on NPUSCH at the end of $n+k'_0-1$, where $k'_0$ is a slot offset which allows the UE sufficient time for NPDSCH decoding.

Figure 8:
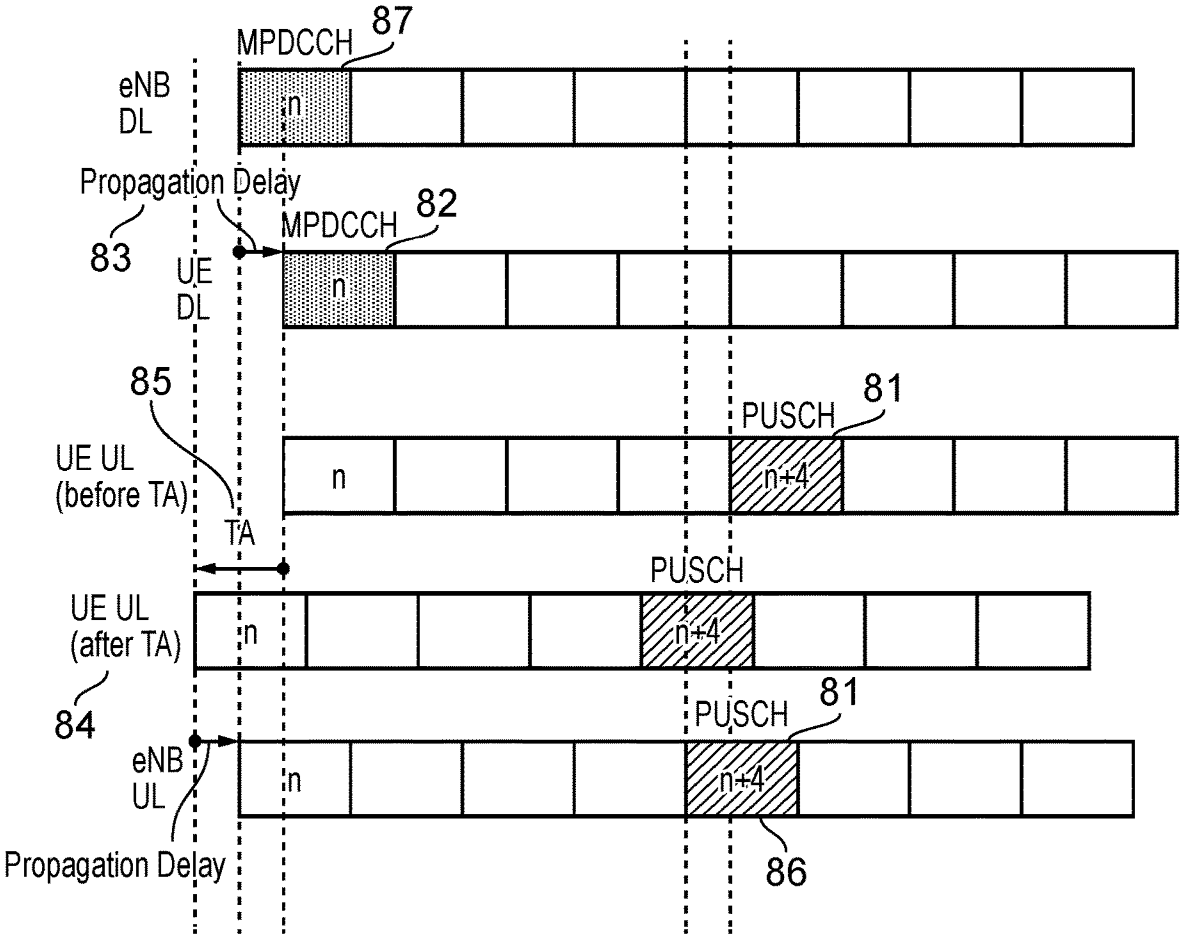
FIG. 8 illustrates a timing relationship between a machine type communication (MTC) physical downlink control channel (MPDCCH) and a corresponding physical uplink shared channel (PUSCH) for enhanced MTC (eMTC) in TN.

FIG. 8 shows the legacy timing relationship between an MPDCCH and a PUSCH in a terrestrial network. The following can be understood with respect to FIG. 8:

Before timing advance is applied, the PUSCH 81 is transmitted in subframe n+4 relative to the MPDCCH 82 that was received in subframe n;

The UE's UL is timing advanced 84 by a value TA 85, which is twice the propagation delay 83; and After the propagation delay 83, the PUSCH is received 86 in subframe n+4 relative to the eNB's MPDCCH 87.

It should be appreciated that while the UE nominally has three whole subframes in which to process the PUSCH between MPDCCH and PUSCH transmission, due to the demands of the timing advance, the actual amount of time that the UE has to process the PUSCH is reduced by the TA amount, i.e. the UE has three subframes minus TA time to process the PUSCH.

The timing relationships for different channels/signals in NR/5G are detailed further in section 6. 2.1.1 of [3].

Considering that the propagation delay is very long for NTN, the timing relationships between downlink and uplink channels and signals will change (relative to the relationships for a terrestrial network) and hence some enhancements are necessary.

Introduction of $K_{offset}$ Value for NTN

In [3], it is proposed that an offset value $K_{offset}$ be introduced to handle DL-UL timing interaction. This offset value has the effect of modifying the current timing relationships in NTN; at least for some UL channels and signals.

Figure 9:
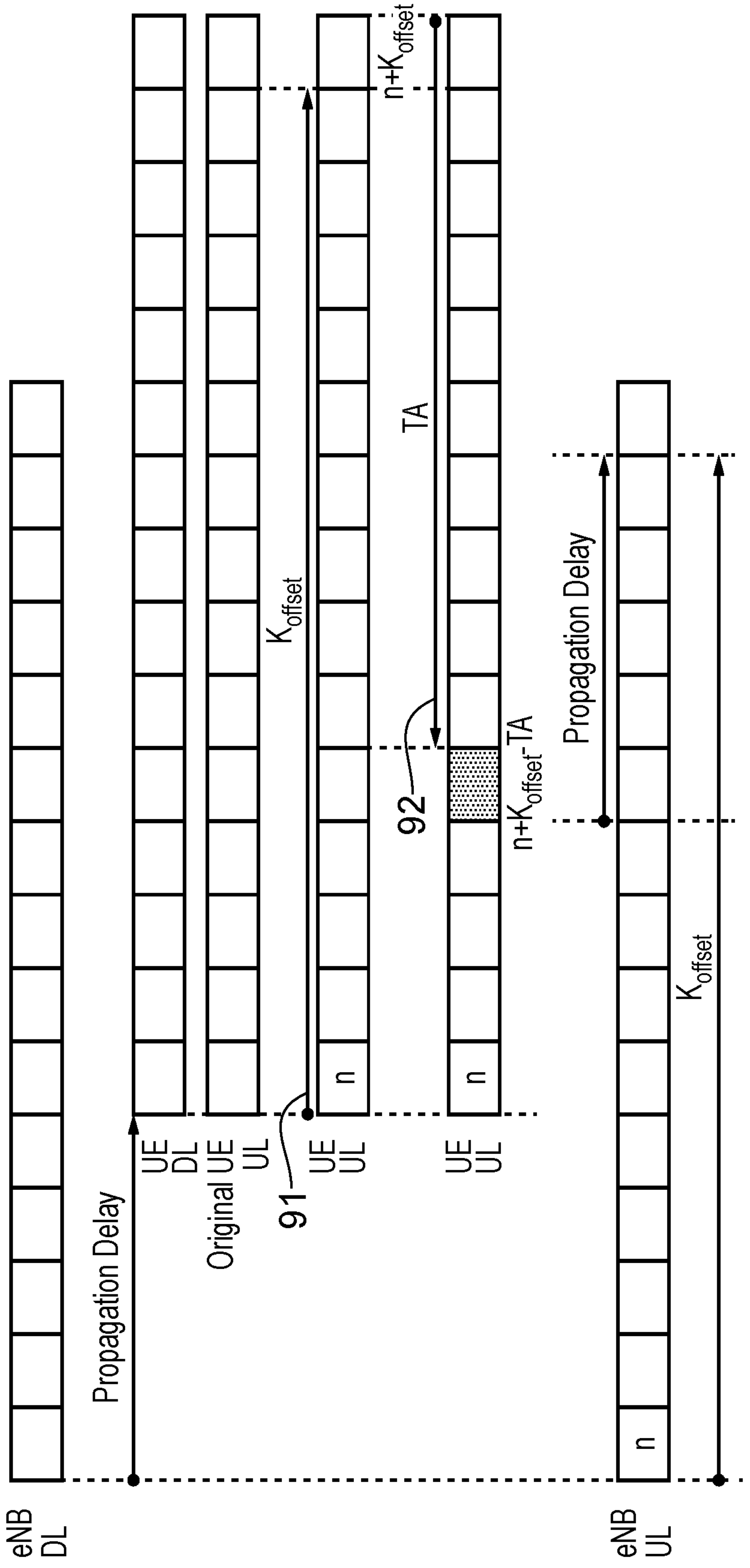
FIG. 9 illustrates how timing relationships may be modified based on an offset value $K_{offset}$.

FIG. 9 shows how the timing relationships may be modified based on $K_{offset}$, where the DL and UL are synchronized at the eNB. A UE first applies $K_{offset}$ 91 which moves its UL timing to the future prior to applying the large TA 92 which advances the UE UL timing closer to the current time. As shown in FIG. 9, the timing of the start of the current UL subframe becomes $n+K_{offset}-TA$ after applying the $K_{offset}$ and TA values. This means that it is expected that any UL channel/signal transmitted at time $n+K_{offset}-TA$ with respect to the UE's timing will arrive at the eNB at time $n+K_{offset}$ with respect to the eNB's timing.

A coarse $K_{offset}$ value can be configured and broadcast in advance, in a cell-specific manner. However, a UE can be updated with a finer $K_{offset}$ value in a UE-specific manner during (or after) the performance of an initial access procedure.

Figure 10:
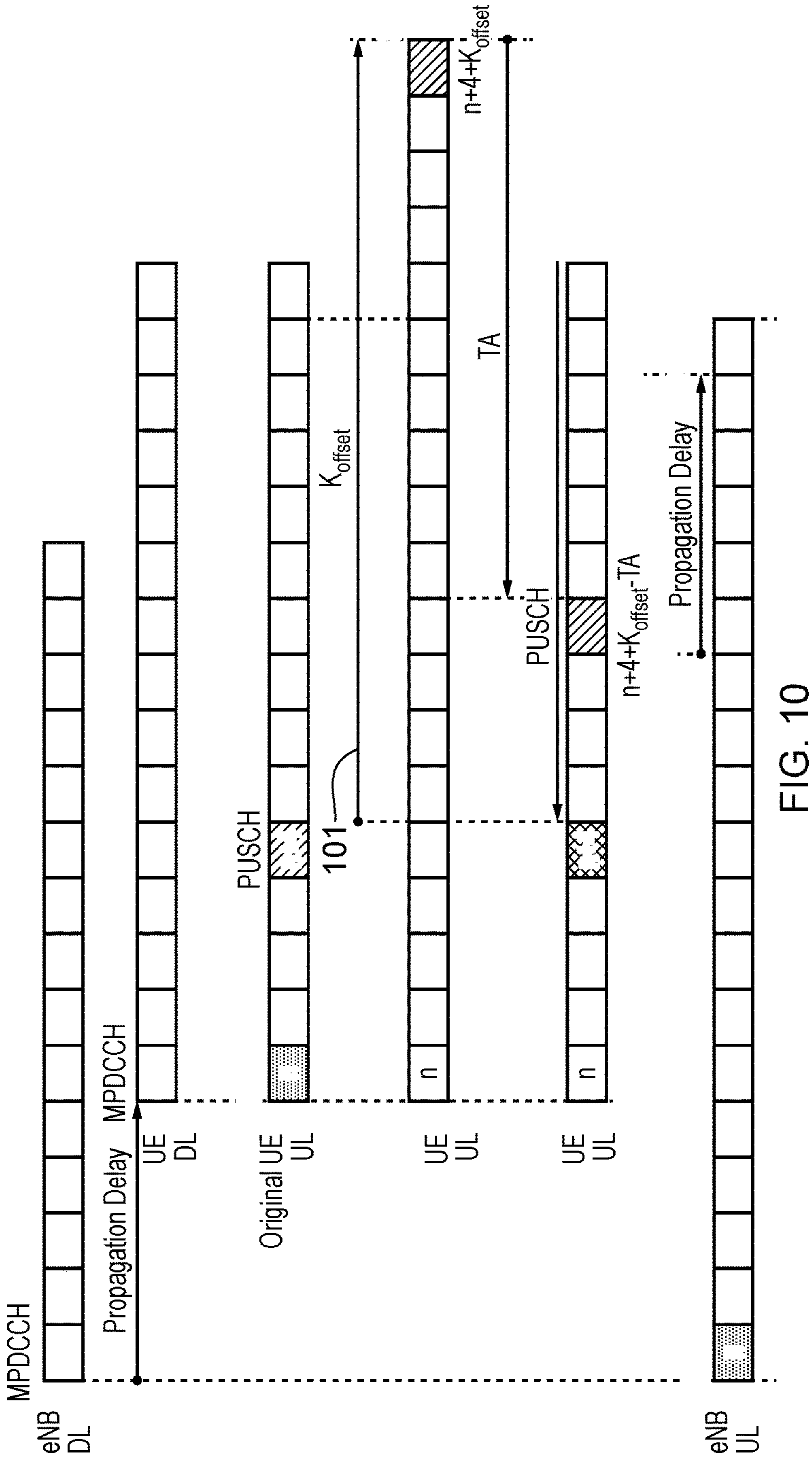
FIG. 10 illustrates the modification of timing relationships between an MPDCCH and a corresponding PUSCH based on the offset value $K_{offset}$.

While FIG. 9 shows the basic method of the application of $K_{offset}$ that is used to tolerate large values of timing advance, FIG. 10 illustrates how $K_{offset}$ is applied in an example of an eMTC timing relationship. The example timing relationship illustrated by FIG. 10 is that between MPDCCH reception and PUSCH transmission. As described above, if an MPDCCH is received in subframe n, the corresponding PUSCH is transmitted in subframe n+4. FIG. 10 shows that the timing relationship between the MPDCCH and PUSCH is extended at the eNB by an amount $K_{offset}$ 101; that is, the PUSCH is now received $4+K_{offset}$ subframes following transmission of the MPDCCH. FIG. 10 shows a value of $K_{offset}$ that is greater than the value of TA, leading to the UE having more than three subframes available to process the MPDCCH (specifically, in the example of FIG. 10, the UE has seven subframes to process the MPDCCH). If $K_{offset}$ were equal to the TA, the UE would have only three subframes to process the MPDCCH (i.e. subframes n+1, n+2, and n+3), as per legacy TN operation.

Although FIG. 10 shows an example for the case of a PUSCH, those skilled in the art would appreciate that it is equally applicable to other UL channels, and the general principle is that the timing relationship should be expressed as $n+k+K_{offset}$, with the assumption that the k value may be different for different UL channels.

When propagation delay is long, as described above, a UE has to use the $K_{offset}$ value which means that a UE should transmit an UL channel/signal in a future subframe $K_{offset}$ relative to the current UL timing as shown in FIGS. 9 and 10. However, there are some implications after applying the $K_{offset}$, for example, whether the characteristics of the UL channels/signals will change as they may be dependent on, for example, the subframe number in which they are supposed to be transmitted in the first place.

For example for LTE MTC UEs, when there is a low number of PUSCH repetitions, such as in coverage enhancement (CE) Mode A, the scrambling sequence applied to PUSCH is initialised with known parameters at the start of each subframe (i.e. each $N_{acc}=1$ subframe, a new scrambling sequence is applied to PUSCH). In the case that a large number of repetitions is employed (such as in CE Mode B), the scrambling sequence is initialised with known parameters at the first subframe of each block of $N_{acc}=4$ consecutive subframes for FDD and $N_{acc}=5$ consecutive subframes for TDD.

The purpose of scrambling is to randomise the inter-cell interference. Hence, by applying different scrambling sequences for neighbouring cells in the downlink or for different UEs in the uplink, the interfering signals are randomised. The initialisation parameters for the PUSCH scrambling sequence comprise:

$n_{RNTI}$ which corresponds to the RNTI associated with the PUSCH transmission (e.g. cell radio network temporary identifier (C-RNTI) or temporary cell radio network temporary identifier (TC-RNTI));

the starting subframe number (i=0 . . . 9, or absolute subframe number in the case of eMTC) of a radio frame number; and the current cell ID.

The corresponding text for eMTC PUSCH in LTE can be understood with reference to section 5.3.1 of [6], which is partly reproduced below:

For BL/CE UEs (unless the PUSCH transmission is using sub-physical resource block (PRB) allocations) the same scrambling sequence is applied per subframe to PUSCH for a given block of $N_{acc}$ subframes. The subframe number of the first subframe in each block of $N_{acc}$ consecutive subframes, denoted as $n_{abs,1}$, satisfies $n_{abs,1} \bmod N_{acc}=0$. For the $j^{th}$ block of $N_{acc}$ subframes, the scrambling sequence generator shall be initialised with $$c_{init} = n_{RNTI} \cdot 2^{14} + q \cdot 2^{13} + [(j_0 + j)N_{acc} \bmod 10] \cdot 2^9 + N_{ID}^{cell}$$

where $$j = 0, 1, \ldots, \left\lfloor \frac{i_0 + N_{abs}^{PUSCH} - 1}{N_{acc}} \right\rfloor - j_0$$

$$j_0 = \lfloor i_0 / N_{acc} \rfloor$$

and $i_0$ is the absolute subframe number of the first uplink subframe intended for PUSCH. The PUSCH transmission spans $$N_{abs}^{PUSCH}$$

consecutive subframes including non-BL/CE UL subframes where the UE postpones the PUSCH transmission. For a BL/CE UE configured in CEModeA, $N_{acc}=1$. For a BL/CE UE configured with CEModeB, $N_{acc}=4$ for frame structure type 1 and $N_{acc}=5$ for frame structure type 2.

Those skilled in the art would appreciate that eMTC only supports a single-codeword transmission, so in the above description taken from [6], q=0. In addition, subframe i in radio frame $n_f$ has an absolute subframe number $$n_{sf}^{abs} = 10n_f + i$$

where $n_f$ is the system frame number and i=0 . . . 9.

In addition, the generation of the demodulation reference signals (DMRS) for PUSCH should be initialised with some known parameters at the beginning of each radio frame, such as Cell ID and slot number ($n_s$=0 . . . 19).

For LTE PUCCH, there are some initialisations (e.g. cyclic shifts) which vary with the symbol number (l) and the slot number ($n_s$) within the radio frame. For LTE SRS (sounding reference signal), there is a cell-specific subframe configuration period $T_{SFC}$ and the cell-specific subframe offset $\Delta_{SFC}$ for the transmission of sounding reference signals as listed in Tables 5.5.3.3-1 and 5.5.3.3-2 of [6], for frame structures type 1 (FDD) and 2 (TDD) respectively. Therefore, SRS transmissions from one or more UEs should arrive on the correct subframe in order to be orthogonal at the eNB receiver.

For LTE PRACH, there are PRACH Configuration indices as given in Table I overleaf, which is reproduced from [6] (corresponding to the uppermost sixteen rows and the leftmost four columns of Table 5.7.1-2 of [6]). As can be seen from Table I, the PRACH resources are dependent on the system radio frame number and a subset of subframes within the selected radio frame. So, PRACH transmission from a UE should arrive at the correct system radio frame and subframe number so that an eNB can detect the PRACH preamble and compute the correct RA-RNTI for random access response (RAR) in the downlink. For example if a UE chooses PRACH Configuration index 2, an eNB must receive the PRACH preamble only on subframe number seven of the even radio frame numbers according to the eNB's timing.

By the same token, there are also some channels and or signals for NR where the initialisation of their scrambling sequence or pseudo-random sequence generator are dependent on slot number within a radio frame.

It should be appreciated by those skilled in the art that in NR, slot number is used in the place of subframe number for the scrambling sequence initialisation. However, in many of the examples described herein, the terminology used by LTE specifications (e.g. subframes) or generic terminology (e.g. time resource units) is used instead of or as well as NR terminology (e.g. slots).

TABLE I

Frame structure type 1 random access configuration for preamble formats 0-3

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| . . . | . . . | . . . | . . . |

Also in NR, for 2-step RACH, the set of preambles used in a particular RACH occasion depends on the slot/subframe number in which the RACH occasion occurs.

A technical issue therefore is how a UE correctly initialises the UL channel/signal so that when the UL channel/signal arrives at the eNB, it has the correct scrambling sequence initialisation with respect to what is expected by the eNB; for example it is based on the correct subframe number or slot number. In other words, a technical problem to solve is how to ensure that the UL channels/signals are received according to the expected eNB's timing and initialisations, particularly when a $K_{offset}$ configuration is used, as well as a TA.

In IoT-NTN, a satellite (e.g. a GEO satellite) can cover a large area, and/or a satellite (e.g. a LEO satellite) may travel at a very high speed—this means that the timing relationship between the UE and the eNB may change rapidly. It is recognised that the TA which is calculated at the UE and/or eNB/gNB, especially at initial access, may not be accurate. This inaccurate determination of the TA value may lead to the UE's initial uplink transmission such as PRACH arriving at a different subframe to the subframe expected by the eNB. Since each subframe uses a different characteristic (e.g. scrambling code) in its encoding, if an uplink transmission using scrambling for the scheduled subframe arrives at a different subframe at the eNB due to TA inaccuracy, then the eNB will be unable to decode it.

Embodiments of the present disclosure seek to address the above technical issues so that the UE and eNB are aligned on the transmission timing and characteristics of the UL channels/signals.

Determining Uplink Transmission Characteristics for Large Propagation Delays

Figure 11:
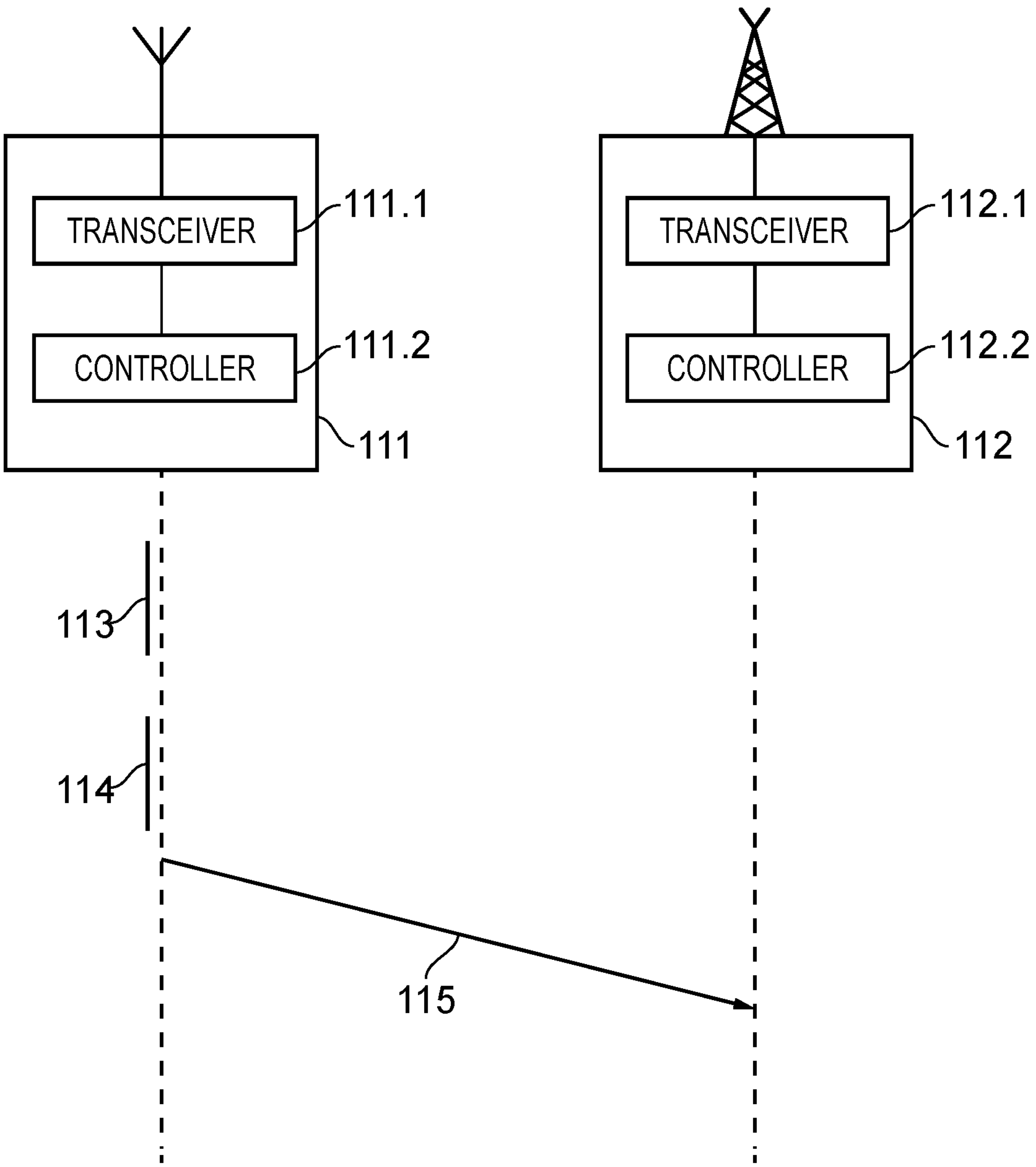
FIG. 11 is a part schematic, part message flow diagram representation of a wireless communications network comprising a communications device and an infrastructure equipment in accordance with embodiments of the present technique.

FIG. 11 shows schematic representation of a wireless communications system comprising a communications device 111 and an infrastructure equipment 112 forming part of wireless communications network. The communications device 111 is configured to transmit signals to and/or to receive signals from the infrastructure equipment 112. The communications device 111 and infrastructure equipment 112 each comprise a transceiver (or transceiver circuitry) 111.1, 112.1 and a controller (or controller circuitry) 111.2, 112.2. Each of the controllers 111.2, 112.2. may be, for example, a microprocessor, a CPU, or a dedicated chipset, etc. The transceivers (or transceiver circuitry) 111.1, 112.1 of one or each of the communications device 111 and infrastructure equipment 112 may comprise both a transmitter and a receiver, or mayinstead of being a transceiver—be a standalone transmitter and receiver pair. It would be appreciated by those skilled in the art that the infrastructure equipment 112 (as well as in some arrangements the communications device 111 and any other infrastructure equipment or communications devices operating in accordance with embodiments of the present technique) may comprise a plurality of (or at least, one or more) transceivers (or transceiver circuitry) 111.1, 112.1.

Specifically, as is shown by FIG. 11, the transceiver circuitry 111.1 and the controller circuitry 111.2 of the communications device 111 are configured in combination to determine 113 that the communications device 111 has uplink data to transmit to the wireless communications network (e.g. to the infrastructure equipment 112), to construct 114 an uplink signal comprising the uplink data by initialising one or more characteristics of the uplink signal, wherein the one or more characteristics of the uplink signal are associated with a reference value known to each of the communications device 111 and the wireless communications network (e.g. to the infrastructure equipment 112), and to transmit 115 the uplink signal to the wireless communications network (e.g. to the infrastructure equipment 112).

In the example communications system shown in FIG. 11, and in accordance with embodiments of the present technique, the infrastructure equipment 112 may be a non-terrestrial infrastructure equipment, where the non-terrestrial infrastructure equipment either may be located at one of a satellite, an airborne vehicle or an airborne platform, or may be or be ground-based but in communication with one of a satellite, an airborne vehicle or an airborne platform. In other words, the wireless communications network is a non-terrestrial network (NTN) where the communications device 111 is configured to transmit the signals to and/or to receive the signals from the NTN, the communications device 111 is configured to communicate with the infrastructure equipment 112 which is a non-terrestrial infrastructure equipment forming part of the NTN via at least one of a plurality of satellite spot beams which provides the wireless access interface for transmitting the signals to and/or receiving the signals from the non-terrestrial infrastructure equipment 112 within a coverage region formed by the at least one or more of the spot beams. In the following description reference to a coverage area being formed by a spot beam provided by a non-terrestrial network infrastructure equipment such as non-terrestrial infrastructure equipment 112 should also be interpreted as being a cell as an alternative because each satellite may provide one or more spot beams each having their own cell identity, in which case there is cell selection/reselection. For cases in which the infrastructure equipment 112 may be a non-terrestrial infrastructure equipment, and may comprise a plurality of transceivers 112.1 these transceivers 112.1 may have a one-to-one relationship with the transmitted spot beams.

While the present application refers in many examples to NTN, those skilled in the art would appreciate that embodiments of the present technique could equally apply to TN, UEs operating in accordance with a dual-connectivity mode between TN and NTN or handing over between TN and NTN, or indeed any other conceivable system or scenario in which propagation delays are large and therefore a TA, or a TA in combination with an offset such as $K_{offset}$, may not be sufficient for both aligning a transmitting UE and receiving eNB with respect to transmission timing, and ensuring that the UE and eNB share the same understanding of the characteristics of the UL signals or channels.

In arrangements of embodiments of the present technique, the one or more characteristics of the uplink signal may refer to (or comprise) one or more of the following:

- a scrambling code used to scramble the uplink signal/channel,
- a property of a demodulation reference signal (DMRS) sequence generated for the uplink signal/channel. Properties of a DMRS can include one or more of:
  - An initialisation of the sequence applied to a DMRS;
  - A pattern of resource elements used to convey the DMRS; and
  - Whether the DMRS exists in a subframe or not;
- a frequency hopping pattern (i.e. depending on the reference value, the uplink signal/channel may be transmitted at a different frequency in accordance with the frequency hopping pattern),
- whether the uplink signal is to be transmitted within reserved resources of the wireless access interface (e.g. if some PRBs of a particular subframe were reserved, the uplink signal would not be transmitted within those PRBs),
- whether the uplink signal is to not be transmitted within invalid resources (within which it may have been at least partially scheduled for transmission) of the wireless access interface (e.g. subframes which are reserved such that eMTC/NB-IoT signals are not transmitted in these subframes-if the uplink channel is to be transmitted in accordance with a number of repetitions for example, then this "invalid resource" status would impact whether one or more of those repetitions are actually transmitted or not), and
- a transmission power with which the uplink signal is transmitted, where for example different transmission powers may be associated with different subframes/slots (if for example the network wishes to minimise interference on certain subframes).

Essentially, these embodiments of the present technique provide solutions to the problem of how to align UE and eNB transmission timings and characteristics. In particular, embodiments of the present technique may find application with NTN, where large propagation delays exist and relative mobility between UEs and eNBs may be significant.

In some embodiments of the present disclosure, the UE constructs an uplink transmission based on a reference time resource unit $K_{ref}$. In other words, the reference value refers to a sequence number of a reference time resource unit of the wireless access interface. Here, time resource unit refers to any conceivable unit of time within radio resources which may be appropriate in a given scenario. For example, time resource unit may refer to a subframe, to a radio frame, to a slot, to a sub-slot, etc. Here, the characteristics of the uplink transmission (for example, the scrambling code used)

are based on $K_{ref}$. In accordance with embodiments of the present disclosure, $K_{ref}$ may be the absolute number of a time resource unit, or it may be a relative number, which indicates a number of time resource units with respect to something else.

In various arrangements of embodiments of the present technique, the value of $K_{ref}$ may be used for multiple consecutive or periodic or other-patterned transmissions, or may be used on a per-transmission basis, depending on implementation.

In various arrangements of embodiments of the present technique, the value of $K_{ref}$ can be RRC configured by the network, determined in the specifications or dynamically indicated in the DCI or via MAC CE signalling. In other words, the communications device is configured to determine the sequence number of the reference time resource unit via a Radio Resource Control (RRC) configuration signalled by the wireless communications network, to receive an indication of the sequence number of the reference time resource unit from the wireless communications network via Medium Access Control (MAC) Control Element (CE) signalling, and/or to receive an indication of the sequence number of the reference time resource unit from the wireless communications network via Downlink Control Information (DCI) signalling, and/or the sequence number of the reference time resource unit is predetermined and known to the communications device (i.e. it is fixed in the specifications). Hence, the UE and eNB/gNB have a common understanding of which scrambling code or other characteristic (e.g. DMRS sequence) of an uplink transmission is used regardless of where the uplink transmission arrives at the eNB/gNB.

In arrangements of embodiments of the present technique in which the value of $K_{ref}$ is signalled by RRC, the reference subframe can be indicated as:

- The number of subframes relative to the $K_{offset}$ value. In other words, the RRC configuration indicates the sequence number of the reference time resource unit as an offset with respect to an NTN offset value applied by the communications device for transmitting signals to the wireless communications network, wherein the NTN offset value defines a number of time resource units of the wireless access interface by which the communications device is to modify its timing with respect to a timing of the wireless communications network. For example, if $K_{ref}$ is signalled as −2, the reference subframe would be the subframe $K_{offset}-2$ relative to another known timing relationship. For example, if an eMTC UE is scheduled by MPDCCH in subframe n to transmit PUSCH at a timing offset of $K_{offset}$ and with a $K_{ref}$ of −2:
  - The known timing relationship is that PUSCH is transmitted 4 subframes after the MPDCCH is received in subframe ‘n’.
  - The UE prepares to transmit PUSCH in subframe $n+4+K_{offset}$;
  - The UE scrambles the PUSCH with the scrambling code that is associated with subframe $n+4+K_{offset}-K_{ref}=n+2+K_{offset}$, and
  - The UE timing advances the transmission by whatever value is calculated by the UE based on global navigation satellite system (GNSS) measurements and timing advance offsets signalled by the eNB;
- The number of subframes relative to the legacy TN scheduling delay value. In other words, the RRC configuration indicates the sequence number of the reference time resource unit as an offset with respect to a terrestrial network, TN, offset value applied by the communications device to signals transmitted to the wireless communications network, wherein the TN offset value defines a number of time resource units of the wireless access interface from a first time resource unit in which a scheduling message is received by the communications device from the wireless communications network to a second time resource unit in which a signal scheduled by the scheduling message is to be transmitted by the communications device to the wireless communications. For example, if $K_{ref}$ is signalled as ‘5’ for eMTC, the PUSCH is sent in subframe $n+4+K_{ref}=n+4+5=n+9$, if MPDCCH is sent in subframe ‘n’;
- The number of subframes relative to the subframe in which a scheduling message (e.g. DCI) is received by the UE. In other words, the communications device is configured to receive, from the wireless communications network, a scheduling message indicating that the uplink signal is to be transmitted by the communications device to the wireless communications network, and the RRC configuration indicates the sequence number of the reference time resource unit as an offset with respect to a sequence number of a time resource unit of the wireless access interface in which the scheduling message is received by the communications device. For example, if $K_{ref}$ is signalled as ‘6’ for eMTC, the PUSCH is sent in subframe $n+K_{ref}=n+6$, if MPDCCH is sent in subframe ‘n’.

RRC signalling can also indicate the number of consecutive subframes in which the same scrambling code is to be applied. In other words, the RRC configuration indicates a number of consecutive sequence numbers of time resource units of the wireless access interface for which the communications device is to initialise the same characteristics when constructing uplink signals. For example, RRC signalling can indicate to the UE that it should apply scrambling code SC1 for subframes n, n+1, n+2, n+3. The UE would then use scrambling code SC2 for subframes n+4, n+5, n+6, n+7. Such an arrangement allows the PUSCH to arrive at the eNB with a timing error of more than a subframe and still be decodable by the eNB (the eNB can try to decode the PUSCH using the same scrambling code in all of the four subframes discussed). Here, this consecutive number of subframes indicated by the RRC configuration may in some examples (or may not in other examples) comprise $K_{ref}$.

RRC signalling can be channel-specific. In other words, the sequence number indicated by the RRC configuration is dependent on the type of channel on which the uplink signal is transmitted. For example, one value of $K_{ref}$ can be used for PUSCH transmissions and a different value of $K_{ref}$ can be used for PUCCH transmissions. Such an arrangement can be useful for cases where the timing misalignment is different for different physical channels. For example, if PUSCH transmissions are misaligned by two subframes, $K_{ref}=-2$ can be signalled for PUSCH; while if PUCCH transmissions are always correctly aligned, $K_{ref}=0$ can be signalled for PUCCH.

RRC signalling can indicate a table of possible $K_{ref}$ values and the $K_{ref}$ value that is actually used can be signalled in DCI by DCI indicating the index of the $K_{ref}$ value in the table that is to be used. In other words, the RRC configuration indicates a plurality of sequence numbers of candidate reference time resource units, and the communications device is configured to receive, from the wireless communications network, signalling indicating which of the candidate reference time resource units is the reference time resource unit with which the characteristics of the uplink signal to be constructed are associated. In such arrangements, the values of $K_{ref}$ in the table may be absolute numbers of time resource unit, or may be offset values indicating $K_{ref}$ as being offset from something else (e.g. $K_{offset}$) by a certain amount.

As described above, in some arrangements of embodiments of the present technique, $K_{ref}$ can be determined based on explicit MAC CE signalling. Here, $K_{ref}$ can be signalled as a MAC CE field. In other words, the MAC CE comprises a specific field which indicates the sequence number of the reference time resource unit. In such arrangements, the value of $K_{ref}$ indicated by the MAC CE may be an absolute number of a time resource unit, or may be an offset value indicating $K_{ref}$ as being offset from something else (e.g. $K_{offset}$) by a certain amount.

In some others of such arrangements of embodiments of the present technique however, $K_{ref}$ can be determined based on implicit MAC CE signalling. In other words, the MAC CE implicitly indicates the sequence number of the reference time resource unit, and the communications device is configured to determine the sequence number of the reference time resource unit based on a value of a different parameter to the sequence number of the reference time resource unit indicated by the MAC CE. In such arrangements, the value of $K_{ref}$ implicitly indicated by the MAC CE may be an absolute number of a time resource unit, or may be an offset value indicating $K_{ref}$ as being offset from something else (e.g. $K_{offset}$) by a certain amount.

Here, the $K_{ref}$ can be determined, for example, based on the timing advance field within the MAC CE signalling (and indeed in such an example, where the MAC CE indicates $K_{ref}$ as an offset from something else (e.g. $K_{offset}$), this offset may be determined based on the timing advance field). A large value of timing advance could indicate a larger value of $K_{ref}$ (this is advantageously based on the observation that if a large timing advance value is applied, the PUSCH transmission may move to a wholly earlier subframe). Hence, in at least some of such arrangements of embodiments of the present disclosure, there may be a set of ranges that define which $K_{ref}$ values are applied, e.g.:

$$0 \le TA < 0.5 \text{ ms}: K_{ref} = 0;$$

$$0.5 \text{ ms} \le TA < 1.5 \text{ ms}: K_{ref} = -1;$$

$$1.5 \text{ ms} \le TA < 2.5 \text{ ms}: K_{ref} = -2;$$

etc.

As described above, in some arrangements of embodiments of the present technique, $K_{ref}$ can be dynamically signalled in DCI. Again, as for MAC CE signalling used to convey $K_{ref}$, the signalling can be either explicit or implicit.

In an example of explicit signalling, a bit field within the DCI encodes the $K_{ref}$ value. In other words, the DCI comprises a bit field, wherein the sequence number of the reference time resource unit is dependent on a value indicated by the bit field. The mapping between the DCI field and $K_{ref}$ value can either be defined in the specifications or signalled via RRC signalling (as described above with reference to RRC signalling). In such arrangements, the value of $K_{ref}$ indicated by the bit field may be an absolute number of a time resource unit, or may be an offset value indicating $K_{ref}$ as being offset from something else (e.g. $K_{offset}$) by a certain amount.

Similarly to the above-described examples of implicit signalling of $K_{ref}$ for MAC CE signalling, for DCI signalling, the DCI may implicitly indicate the sequence number of the reference time resource unit, and the communications device may be configured to determine the sequence number of the reference time resource unit based on a value of a different parameter to the sequence number of the reference time resource unit indicated by the DCI.

In an example of implicit signalling, the $K_{ref}$ value can be derived based on a timing offset that is signalled in the DCI. For example, in NB-IoT, the time between the NPDCCH and NPUSCH is signalled in DCI format NO as the NPUSCH scheduling delay, taking potential values of {8,16,32,64}. Scheduling delays of 8,16 could be associated with $K_{ref}$=0 and scheduling delays of 32,64 could be associated with $K_{ref}$=−1.

In a further example of implicit signalling, the $K_{ref}$ value can be derived based on a timing advance field that is signalled within DCI. While Rel-16 specifications do not support signalling of timing advance within DCI, such signalling might be desirable for IoT-NTN where the timing advance can change rapidly (due to the speed of the satellite). The network may control that certain signalled TA values are associated with certain $K_{ref}$ values. In one example, the mapping between TA and $K_{ref}$ might be the same as shown above in the bulleted list for the arrangements of embodiments of the present technique in which the $K_{ref}$ value is signalled by a MAC CE.

In IoT-NTN, some of the timing advance that the UE applies can be determined by the UE (this is a UE-derived timing advance). For example, the UE can calculate an amount of timing advance to apply based on GNSS measurements, where the UE measures its distance from a known reference point and calculates the propagation time to that point in order to determine part of the timing advance to apply. However, the timing advance that the UE applies is controlled to some extent by the eNB:

- The eNB can signal a common timing advance that will be applied by UEs;
- The eNB can configure the UE to use a timing advance that is signalled by the eNB, rather than a UE-derived timing advance value;
- It is also possible that the eNB can signal an additional timing advance that the UE should apply.
  - In one case, this additional timing advance is added to the common timing advance and the UE-derived timing advance. The additional timing advance allows the eNB to more accurately align the received PUSCH transmissions with the eNB's UL subframe timing.
  - In another case, this additional timing advance is added to the UE-derived timing advance. The additional timing advance allows the eNB to (1) more accurately align the received PUSCH transmissions with the eNB's UL subframe timing and (2) account for the changing propagation delay on the feeder link between the eNB and the satellite.

The algorithm that controls the timing advance that is signalled by the eNB is up to eNB implementation. The timing advance algorithm typically aims to align received PUSCHs from UEs, but can be used to provide offset timing between a PUSCH and a PDSCH at the eNB (the eNB applies a timing advance to UEs that ensures that the UL subframe timing is delayed relative to the DL subframe timing by the timing advance amount).

In view of this, in some arrangements of embodiments of the present technique, the eNB scheduler may use a timing advance to change the timing relationship between physical channels by introducing an offset between UL and DL subframe timing of one subframe or more. In other words, the infrastructure equipment is configured to transmit an indication of a timing advance value to the communications device, the timing advance value defining an offset between the timings of downlink time resource units of the wireless access interface and uplink time resource units of the wireless access interface at the communications device, and to determine the sequence number of the reference time resource unit based at least in part on the timing advance value. Here, the infrastructure equipment may be configured to determine the sequence number of the reference time resource unit based on the timing advance value and an NTN offset value (i.e. $K_{offset}$).

An example use of the offset would be a case where MPDCCH to PUSCH timing is constrained to be a fixed amount (e.g. 4 subframes for eMTC TN) or has a limited set of values that can be signalled (e.g. 8,16,32,64 subframes in NB-IoT). By choosing the appropriate timing advance value, the eNB can change that otherwise-constrained timing. For example, if the eNB applies a timing advance of one subframe, it can change the MPDCCH to PUSCH timing to be three subframes (instead of four subframes). In this case, the eNB would also signal that $K_{ref}=-1$ is applied, such that the scrambling code that the UE applies is appropriate for a PUSCH that is received by the eNB in subframe n+3.

Embodiments of the present technique may find application for the construction by a UE of uplink transmissions/channels which are either dynamically scheduled or pre-configured.

For dynamically scheduled transmissions, a UE detects a DCI at DL subframe n and must perform UL transmission, for example, at subframe n+k. Those skilled in the art would appreciate that the k value here differs for different channels and signals, as well as for different systems (for example, LTE and NR).

In arrangements of embodiments of the present technique, for dynamically scheduled transmissions, if the UE receives an UL grant in subframe n, the scheduled uplink transmission should be constructed using the characteristics (e.g. scrambling code, DMRS sequence, etc.) based on subframe $n+K_{ref}$. In other words, the communications device is configured to receive, from the wireless communications network, a scheduling message indicating that the uplink signal is to be transmitted by the communications device to the wireless communications network, and wherein the sequence number of the reference time resource unit is dependent on a sequence number of a time resource unit of the wireless access interface in which the scheduling message is received by the communications device. For such a transmission scheme, two different approaches for determining the characteristics for an UL channel/signal are identified as described below.

In a first approach of such arrangements of embodiments of the present technique for dynamically scheduled transmissions, the UE may construct the uplink transmission according to the expected eNB reception timing. In this first approach, $K_{ref}$ refers to the subframe in which the eNB expects to receive the uplink transmission; that is $K_{ref}=k+K_{offset}$. The subframe in which the eNB expects to receive the UL channel/signal is given by $n+k+K_{offset}$ where n is the subframe in which the eNB completed the transmission of the downlink scheduling grant or DCI, assuming that DL and UL are synchronised at the eNB.

Figure 12:
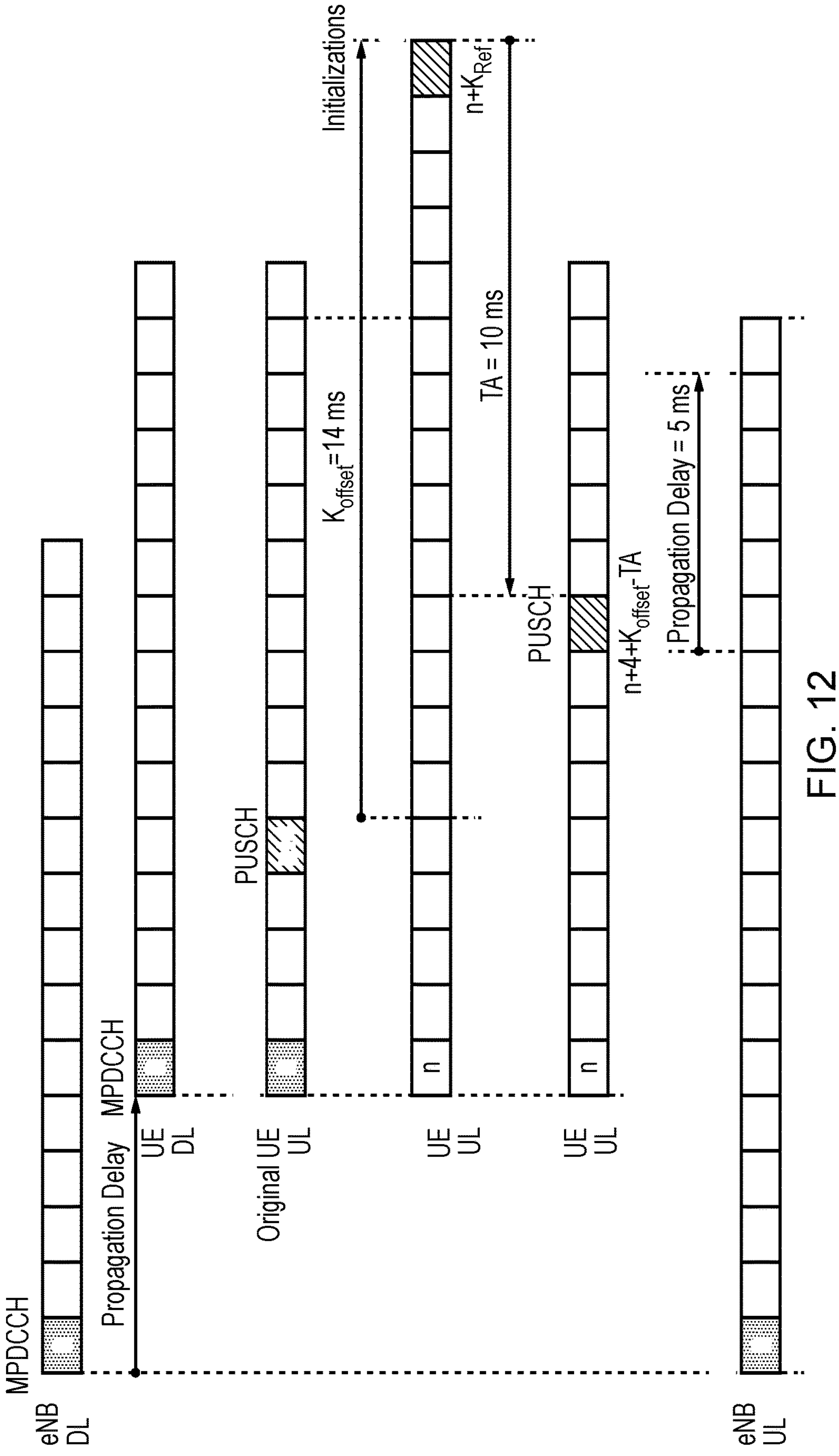
FIG. 12 shows a first example timing diagram in which a communications device may determine the characteristics with which it should construct a signal to transmit to a wireless communications network based on a determined time of reception of the signal by the wireless communications network in accordance with embodiments of the present technique.

For example as shown by FIG. 12, it is assumed that a UE has received $K_{offset}=14$ ms in advance, for example, via system information. Then the UE completes the reception of a DCI at subframe n that is scheduling a PUSCH whereby the eNB to UE propagation delay is for example 5 ms. Based on this propagation delay, the TA becomes 10 ms. As can be seen from FIG. 12, the UE first applies the $K_{offset}$ value which shifts the current subframe timing into the future by 14 ms. Afterwards, the UE employs the TA value which moves the transmission subframe timing backward by 10 ms to the position of $n+K_{offset}-TA$. As a result, the UE transmits the PUSCH at subframe starting at $n+k+K_{offset}-TA$, where k=4 (i.e. according to existing eMTC specifications).

In legacy systems, the UE would apply the characteristics of the PUSCH (e.g. scrambling and DMRS) based on subframe n+k. However, in this approach, a UE can base the characteristics of the PUSCH and its associated DMRS on the future subframe timing prior to applying the TA value; that is, the characteristics of the PUSCH are derived as if it were transmitted in subframe $n+K_{ref}$. The UE will therefore initialise the scrambling sequence for the PUSCH and the pseudo-random sequence generator for the DMRS with the subframe number $n+K_{ref}$. It should be noted that for eMTC, subframe $n+K_{ref}$ is the absolute subframe number of the first uplink subframe denoted by i, based on the equation recited above with reference to [6]. As illustrated by FIG. 12, the scrambling and the DMRS sequences are appropriate for the time at which the PUSCH arrives at the. Hence, the eNB and UE are aligned on the characteristics of the UL PUSCH and the associated DMRS.

It should be appreciated that in the above discussion k (or $k_0$ when referring to slots rather than subframes) is separated from the $K_{offset}$ value. However, it is possible to combine k into $K_{offset}$ and represent it as $K_{ref}=K_{offset}$. Hence, in such a case the initialisation will still be based on subframe $n+K_{ref}$.

In a second approach of such arrangements of embodiments of the present technique for dynamically scheduled transmissions in which scheduled uplink transmissions are to be constructed using the characteristics based on subframe $n+K_{ref}$, the UE may construct the uplink transmission according to UE legacy transmission timing. In this second approach, $K_{ref}=k$; that is the UE applies the scrambling based on subframe n+k (where, in some examples, k=4). Here, the characteristics of an UL channel/signal is determined according to the UE's legacy transmission timing. For example, the scrambling sequence for an UL Channel/signal would be initialised with the subframe number in which UE is supposed to transmit the UL channel/signal in the legacy system; i.e. before introducing the long TA and the $K_{offset}$ value; that is subframe n+k.

Figure 13:
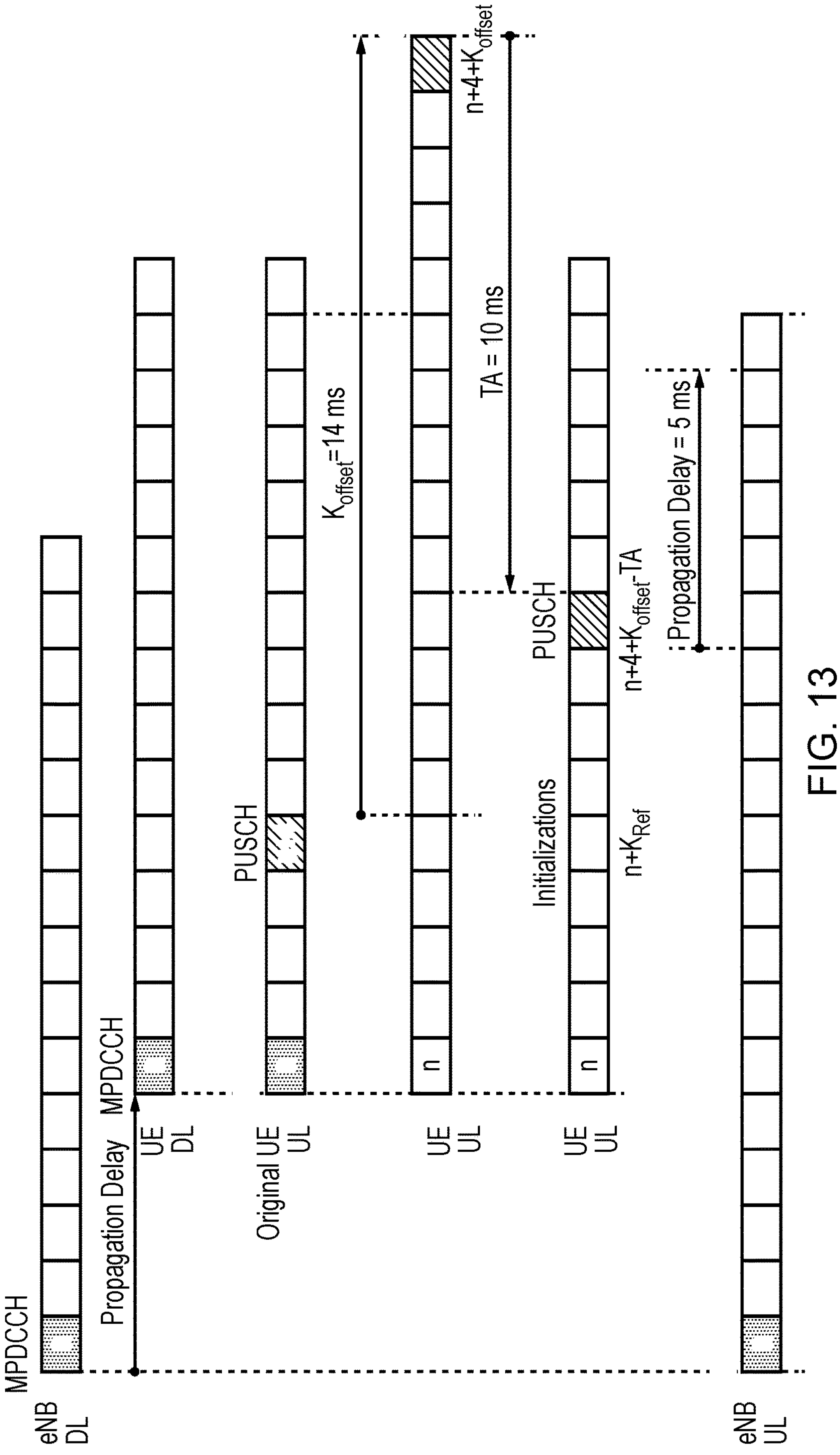
FIG. 13 shows a second example timing diagram in which a communications device may determine the characteristics with which it should construct a signal to transmit to a wireless communications network based on a time of transmission of the signal by the communications device in accordance with embodiments of the present technique.

An example is shown in FIG. 13, where the parameters are the same as in FIG. 12; i.e. $K_{offset}=14$ ms, the propagation delay is 5 ms, and as a result of the propagation delay being 5 ms, the TA value becomes 10 ms. A UE first applies the $K_{offset}$ value which shifts the current subframe timing forward by 14 ms. Afterwards, the UE employs the TA value which moves the current subframe timing backward by 10 ms to the position of $n+k+K_{offset}-TA$. Accordingly, the UE transmits the PUSCH at subframe starting at $n+k+K_{offset}-TA$ where k=4.

In legacy LTE systems, when a UE receives scheduling DCI at subframe n, the UE transmits the corresponding PUSCH at subframe n+k. Therefore, in this approach, the UE bases the characteristics of the PUSCH and its associated DMRS always at the subframe starting at $n+K_{ref}$ (though it should be noted that, for eMTC, it is the absolute subframe number of the first uplink subframe denoted by $i_0$ based on the equation recited above with reference to [6]). This does not mean that the UE has to transmit the PUSCH at subframe starting at n+$K_{ref}$, but the UE should transmit the PUSCH at subframe starting at n+k+$K_{offset}$−TA. In other words, the subframe that the UE transmits the PUSCH and the subframe number used to derive the characteristics of the PUSCH could be different. In this approach, the UE initialises the scrambling sequence for the PUSCH and the pseudo-random sequence generator for the DMRS with subframe number n+$K_{ref}$. The eNB expects to receive the PUSCH transmission at n+k+$K_{offset}$ based on DCI that was scheduled earlier on subframe n. However, the eNB understands that the characteristics of the PUSCH and its associated DMRS are based on subframe number n+$K_{ref}$.

Thus, in the first approach, $K_{ref}$ refers to the subframe in which the eNB expects to receive the uplink transmission; that is $K_{ref}$=k+$K_{offset}$ while in the second approach, $K_{ref}$ refers to the subframe in which the UE is supposed to transmit the uplink transmission before $K_{offset}$ is enforced; that is $K_{ref}$=k. In other words, the sequence number of the reference time resource unit is offset from the sequence number of the time resource unit of the wireless access interface in which the scheduling message is received by the communications device by either, in a first configuration, a predetermined amount or, in a second configuration, a combination of the predetermined amount and an NTN offset value applied by the communications device for transmitting signals to the wireless communications network, wherein the NTN offset value defines a number of time resource units of the wireless access interface by which the communications device is to modify its timing with respect to a timing of the wireless communications network.

In some of such arrangements of embodiments of the present disclosure, the UE may determine whether to use the first approach or the second approach in accordance with the specifications. In other words, the communications device determines whether to determine the sequence number of the reference time resource unit in accordance with the first configuration or the second configuration in a predefined manner.

Alternatively, in others of such arrangements of embodiments of the present disclosure, the eNB can signal, e.g. in the DCI or RRC configuration, which approach the UE should use. In other words, the communications device determines whether to determine the sequence number of the reference time resource unit in accordance with the first configuration or the second configuration dependent on signalling received from the wireless communications network. For example, the signalling could indicate with one bit which of the following values of $K_{ref}$ should be used:

$$\text{Bit} = \text{`0'}: K_{ref} = \text{legacy } TN \text{ `}k\text{' value}$$

$$\text{Bit} = \text{`1'}: K_{ref} = k + K_{offset}$$

In both of the above-described first and second approaches, the timing relationship between the scheduling DCI and the characteristics of the corresponding PUSCH transmission has been discussed as an example with reference to MTC, but those skilled in the art would appreciate that either of the above-described first and second approaches are equally applicable to all dynamically scheduled transmissions (both in TN and NTN, and in NB-IoT as well as MTC), such as:

The DCI carrying RAR and the corresponding msg3 PUSCH;

The DCI carrying MPDCCH order and corresponding PRACH;

The activation DCI and corresponding UL SPS PUSCH;

The received PDSCH and corresponding HARQ-ACK on PUCCH;

The MPDCCH and corresponding CSI on PUCCH; or.

The DCI triggering aperiodic SRS.

For pre-configured UL transmissions where resources are configured in advance, such as PRACH, UL SPS PUSCH (or Configured Grant Type 1), Pre-configured UL Transmission in Idle Mode for eMTC and SRS that have periodic occasions, their UL characteristics must be defined in such a way that eNB and UE understand each other.

In arrangements of embodiments of the present technique, for pre-configured transmissions (which may be periodic), the uplink transmission may be constructed by the UE using the characteristics (e.g. scrambling code) based on reference subframe $K_{ref}$. In other words, the transmission of the uplink signal is a pre-configured uplink transmission within pre-configured resources of the wireless access interface, the pre-configured resources being located within one of a plurality of periodic transmission occasions.

Therefore the UE works out a suitable RACH occasion that lies beyond $K_{ref}$ (which may be configured at least in part by taking into account the current propagation delay (D) between the UE and the eNB). The UE employs reference subframe $K_{ref}$ in encoding its PRACH transmission. The TA inaccuracy for initial access is greater since the UE uses a signalled Common TA, which can be significantly different for different UEs especially in a very large cell. In 2-step RACH (in NR), the initial transmission consists of a PRACH and a PUSCH where the PUSCH DM-RS generator uses an initialisation based on the slot and OFDM symbol numbers in which the PUSCH is transmitted. By basing the DM-RS generation initialization on the slot and OFDM symbol number at $K_{ref}$, the PUSCH can arrive at an unintended subframe but still be decoded by the gNB since the UE and gNB have the same understanding on which DM-RS sequence to use. In other words, when the transmission of the uplink signal is a pre-configured uplink transmission within pre-configured resources of the wireless access interface (where such pre-configured resources are located within one of a plurality of periodic transmission occasions) the communications device is configured to determine, in accordance with the sequence number of the reference time resource unit, within which of the plurality of periodic transmission occasions the uplink signal is to be transmitted by the communications device.

In NTN, when the UE has to transmit RACH at initial access, the UE first determines a suitable RACH occasion that lies beyond $K_{ref}$. The UE then configures the RACH to be transmitted at that occasion by choosing a suitable RACH preamble. The UE then applies the current TA to advance the time of RACH transmission closer to the current time. The RACH transmitted by the UE is expected to arrive at the gNB/eNB within a window in which occurs the desired RACH occasion that was chosen beyond $K_{ref}$.

In NB-IoT and eMTC, any of the RACH preambles configured for use can be used. In NR 2-step RACH, one RACH preamble from amongst the number configured for use in the preferred RACH occasion chosen beyond $K_{ref}$ is used. Furthermore, in 2-step RACH, the RACH preamble is followed by an associated PUSCH. The generation of the DM-RS used for the PUSCH is dependent on the slot number and OFDM symbol number (within the slot) in which the PUSCH occurs. Thus, the configuration of the RACH preamble and PUSCH DM-RS is dependent on the value of $K_{ref}$.

Figure 14:
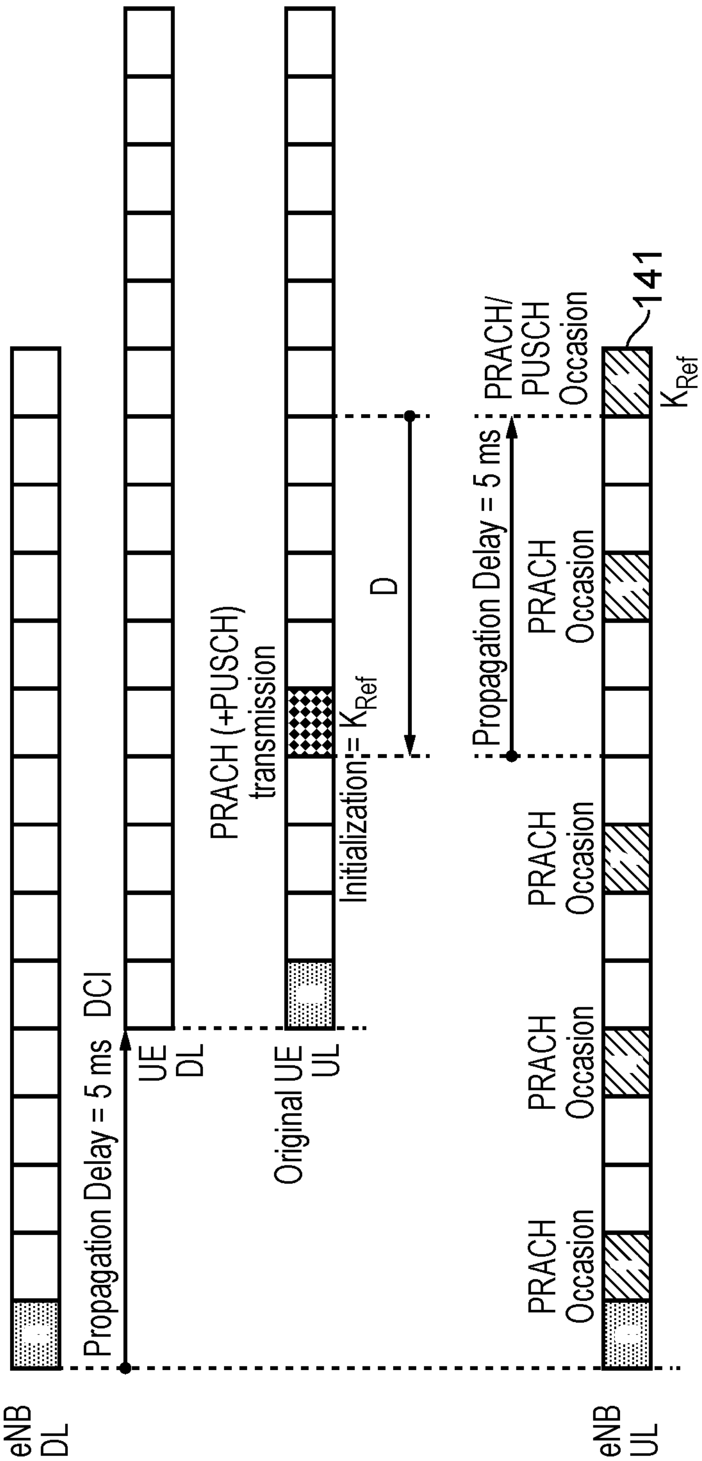
FIG. 14 shows a third example timing diagram in which a communications device may determine the characteristics with which it should construct a signal to transmit to a wireless communications network based on a time of transmission of the signal by the communications device within pre-configured resources in accordance with embodiments of the present technique.

FIG. 14 shows an example where it is assumed that RACH (+PUSCH) occasions are configured in subframes 1, 4, 7 of every radio frame. The propagation delay (D) is 5 ms. A UE intends to transmit a PRACH preamble, and decides its preamble must be received on the occasion at subframe/slot $K_{ref}$=4 (noted by reference 141) according to the eNB subframe timing. By taking into account the propagation delay (D) of 5 ms, the UE works out that the PRACH preamble must be transmitted by 5 ms in advance compared to eNB reception timing of the selected PRACH occasion. In the case there is a 2-step RACH where PRACH and the associated PUSCH are transmitted, the UE initialises the scrambling sequence for the DMRS with slot number beyond $K_{ref}$. Therefore, after the UE transmits the PRACH preamble, the eNB receives it at subframe/slot $K_{ref}$=4 as it is one of the expected PRACH occasions. In ideal timing, the PRACH transmission would arrive at the reference timing of $K_{ref}$ as shown in the example of FIG. 14. However, as the Common TA is not so accurate for initial access, the PRACH transmission may in fact arrive at $K_{ref}$−1 or $K_{ref}$+1. Hence, based on a window where eNB is going to search the PRACH transmissions, PRACH preamble can be blindly detected and PUSCH can be decoded based on the scrambling sequence for the DMRS with subframe/slot number defined by $K_{ref}$.

For other types of transmission, such as SRS, these can be treated in a similar or the same manner as PRACH transmissions are discussed above and with reference to the example of FIG. 14. UL SPS PUSCH transmissions may have some similarities with PRACH transmissions, in the sense that a UE must work out in advance in which subframe an eNB expects to receive its UL transmissions while taking into account the propagation delay between itself and the eNB. However, one difference is that SPS PUSCH should be initialised with a subframe/slot number as defined by the LTE specifications. Therefore, a potential open issue here is which subframe/slot a UE should employ for the initialisation, such as the scrambling sequence for PUSCH and its associated DMRS. In accordance with the above-described arrangements of embodiments of the present technique, it is expected that those arrangements relating to dynamic scheduling (either the first or the second approach) may be applied here for the UL SPS PUSCH. The main motivation, as with other arrangements of embodiments of the present disclosure, is for the eNB and UE to be aligned on the characteristics of the UL SPS transmission.

As can be understood from, for example, Table I above, particular PRACH preambles may only be transmitted and received at certain times, i.e. within certain subframes and radio frames. Hence, a preamble transmission from the UE must be transmitted in a manner such that it is received in a subframe where the eNB expects to detect the PRACH preambles.

In some arrangements of embodiments of the present disclosure, instead of the UE constructing an uplink transmission based on a reference time resource unit $K_{ref}$ (i.e. where the reference value is either an absolute value of a sequence number of a reference time resource unit of the wireless access interface or an offset value from something else, such as $K_{offset}$), the scrambling sequence, DMRS, etc. can be initialised with RNTI (e.g. C-RNTI or TC-RNTI) and/or identifiers configured by higher layers, and/or serving cell-ID. In other words, the reference value is an identifier associated with one of the communications device and a cell of the wireless communications network with which the communications device is currently communicating.

Figure 15:
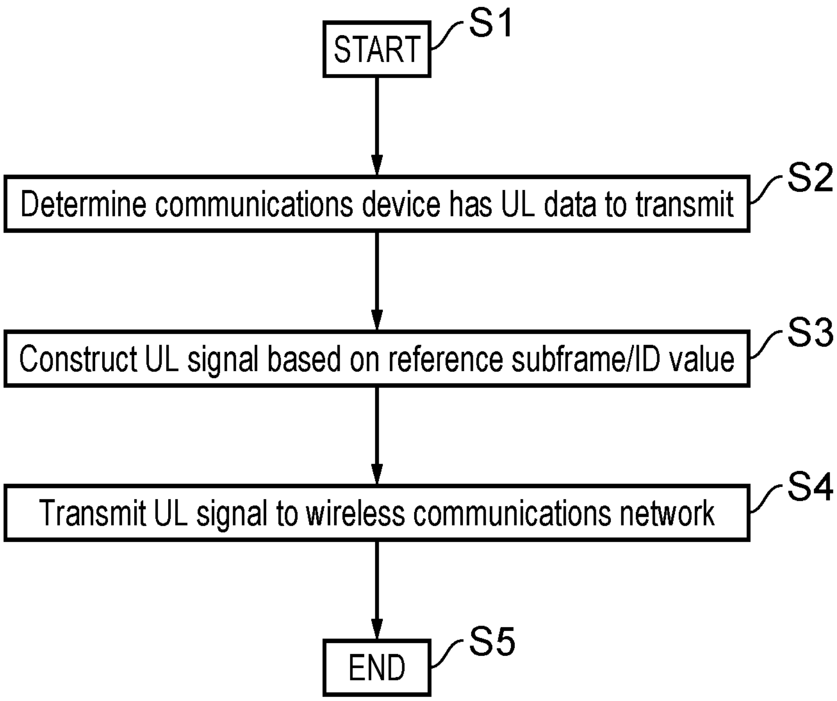
FIG. 15 shows a flow diagram illustrating a process of communications in a communications system in accordance with embodiments of the present technique.

FIG. 15 shows a flow diagram illustrating a first example process of communications in a communications system in accordance with embodiments of the present technique. The process shown by FIG. 15 is a method of operating a communications device for transmitting signals to and/or receiving signals from a wireless communications network (e.g. to and/or from an infrastructure equipment of the wireless communications network) via a wireless access interface (which may be provided by the infrastructure equipment.

The method begins in step S1. The method comprises, in step S2, determining that the communications device has uplink data to transmit to the wireless communications network (e.g. to the infrastructure equipment). In step S3, the process comprises constructing an uplink signal comprising the uplink data by initialising one or more characteristics of the uplink signal, wherein the one or more characteristics of the uplink signal are associated with a reference value known to each of the communications device and the wireless communications network (where such a reference value may for example be a reference time resource unit such as a specific subframe or slot, or an ID value associated with one of the communications device and wireless communications network/infrastructure equipment such as an RNTI or cell ID). The method then comprises, in step S4, transmitting the uplink signal to the wireless communications network (e.g. to the infrastructure equipment). The process ends in step S5.

Those skilled in the art would appreciate that the method shown by FIG. 15 may be adapted in accordance with embodiments of the present technique. For example, other intermediate steps may be included in the method, or the steps may be performed in any logical order. Furthermore, though embodiments of the present technique have been described largely by way of the example communications system shown in FIG. 11, and described by way of the arrangements shown by FIGS. 12 to 14, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating a communications device for transmitting signals to and/or receiving signals from a wireless communications network via a wireless access interface, the method comprising determining that the communications device has uplink data to transmit to the wireless communications network, constructing an uplink signal comprising the uplink data by initialising one or more characteristics of the uplink signal, wherein the one or more characteristics of the uplink signal are associated with a reference value known to each of the communications device and the wireless communications network, and transmitting the uplink signal to the wireless communications network.

Paragraph 2. A method according to Paragraph 1, wherein the wireless communications network is a non-terrestrial network, NTN, and wherein the transmitting the signals to and/or receiving the signals from the NTN comprises communicating with a non-terrestrial infrastructure equipment forming part of the NTN via at least one of a plurality of spot beams which provides the wireless access interface for transmitting the signals to and/or receiving the signals from the non-terrestrial infrastructure equipment within a coverage region formed by the at least one of the spot beams.

Paragraph 3. A method according to Paragraph 1 or Paragraph 2, wherein the one or more characteristics of the uplink signal comprise at least one of a scrambling code, a property of a demodulation reference signal, DMRS, a frequency hopping pattern, whether the uplink signal is to be transmitted within reserved resources of the wireless access interface, whether the uplink signal is to be transmitted within invalid resources of the wireless access interface, and a transmission power.

Paragraph 4. A method according to any of Paragraphs 1 to 3, wherein the reference value refers to a sequence number of a reference time resource unit of the wireless access interface.

Paragraph 5. A method according to Paragraph 4, comprising determining the sequence number of the reference time resource unit via a Radio Resource Control, RRC, configuration signalled by the wireless communications network.

Paragraph 6. A method according to Paragraph 5, wherein the RRC configuration indicates the sequence number of the reference time resource unit as an offset with respect to an NTN offset value applied by the communications device for transmitting signals to the wireless communications network, wherein the NTN offset value defines a number of time resource units of the wireless access interface by which the communications device is to modify its timing with respect to a timing of the wireless communications network.

Paragraph 7. A method according to Paragraph 5 or Paragraph 6, wherein the RRC configuration indicates the sequence number of the reference time resource unit as an offset with respect to a terrestrial network, TN, offset value applied by the communications device for transmitting signals to the wireless communications network, wherein the TN offset value defines a number of time resource units of the wireless access interface from a first time resource unit in which a scheduling message is received by the communications device from the wireless communications network to a second time resource unit in which a signal scheduled by the scheduling message is to be transmitted by the communications device to the wireless communications network.

Paragraph 8. A method according to any of Paragraphs 5 to 7, comprising receiving, from the wireless communications network, a scheduling message indicating that the uplink signal is to be transmitted by the communications device to the wireless communications network, wherein the RRC configuration indicates the sequence number of the reference time resource unit with reference to a sequence number of a time resource unit of the wireless access interface in which the scheduling message is received by the communications device.

Paragraph 9. A method according to any of Paragraphs 5 to 8, wherein the RRC configuration indicates a number of consecutive sequence numbers of time resource units of the wireless access interface for which the communications device is to initialise the same characteristics when constructing uplink signals.

Paragraph 10. A method according to any of Paragraphs 5 to 9, wherein the sequence number indicated by the RRC configuration is dependent on the type of channel on which the uplink signal is transmitted.

Paragraph 11. A method according to any of Paragraphs 5 to 10, wherein the RRC configuration indicates a plurality of sequence numbers of candidate reference time resource units, wherein the method comprises receiving, from the wireless communications network, signalling indicating which of the candidate reference time resource units is the reference time resource unit with which the characteristics of the uplink signal to be constructed are associated.

Paragraph 12. A method according to any of Paragraphs 4 to 11, wherein the sequence number of the reference time resource unit is predetermined and known to the communications device.

Paragraph 13. A method according to any of Paragraphs 4 to 12, comprising receiving an indication of the sequence number of the reference time resource unit from the wireless communications network via Medium Access Control, MAC, Control Element, CE, signalling.

Paragraph 14. A method according to Paragraph 13, wherein the MAC CE comprises a specific field which indicates the sequence number of the reference time resource unit.

Paragraph 15. A method according to Paragraph 13 or Paragraph 14, wherein the MAC CE implicitly indicates the sequence number of the reference time resource unit, wherein the method comprises determining the sequence number of the reference time resource unit based on a value of a different parameter to the sequence number of the reference time resource unit indicated by the MAC CE.

Paragraph 16. A method according to any of Paragraphs 4 to 15, comprising receiving an indication of the sequence number of the reference time resource unit from the wireless communications network via Downlink Control Information, DCI, signalling.

Paragraph 17. A method according to Paragraph 16, wherein the DCI comprises a bit field, wherein the sequence number of the reference time resource unit is dependent on a value indicated by the bit field.

Paragraph 18. A method according to Paragraph 16 or Paragraph 17, wherein the DCI implicitly indicates the sequence number of the reference time resource unit, wherein the method comprises determining the sequence number of the reference time resource unit based on a value of a different parameter to the sequence number of the reference time resource unit indicated by the DCI.

Paragraph 19. A method according to any of Paragraphs 4 to 18, comprising receiving, from the wireless communications network, a scheduling message indicating that the uplink signal is to be transmitted by the communications device to the wireless communications network, and wherein the sequence number of the reference time resource unit is dependent on a sequence number of a time resource unit of the wireless access interface in which the scheduling message is received by the communications device.

Paragraph 20. A method according to Paragraph 19, wherein the sequence number of the reference time resource unit is offset from the sequence number of the time resource unit of the wireless access interface in which the scheduling message is received by the communications device by either, in a first configuration, a predetermined amount or, in a second configuration, a combination of the predetermined amount and an NTN offset value applied by the communications device for transmitting signals to the wireless communications network, wherein the NTN offset value defines a number of time resource units of the wireless access interface by which the communications device is to modify its timing with respect to a timing of the wireless communications network.

Paragraph 21. A method according to Paragraph 20, wherein the communications device determines whether to determine the sequence number of the reference time resource unit in accordance with the first configuration or the second configuration in a predefined manner.

Paragraph 22. A method according to Paragraph 20 or Paragraph 21, wherein the communications device determines whether to determine the sequence number of the reference time resource unit in accordance with the first configuration or the second configuration dependent on signalling received from the wireless communications network.

Paragraph 23. A method according to any of Paragraphs 4 to 22, wherein the transmission of the uplink signal is a pre-configured uplink transmission within pre-configured resources of the wireless access interface, the pre-configured resources being located within one of a plurality of periodic transmission occasions.

Paragraph 24. A method according to Paragraph 23, comprising determining, in accordance with the sequence number of the reference time resource unit, within which of the plurality of periodic transmission occasions the uplink signal is to be transmitted by the communications device.

Paragraph 25. A method according to any of Paragraphs 1 to 24, wherein the reference value is an identifier associated with one of the communications device and a cell of the wireless communications network with which the communications device is currently communicating.

Paragraph 26. A communications device comprising transceiver circuitry configured to transmit signals to and/or to receive signals from a wireless communications network via a wireless access interface, and controller circuitry configured in combination with the transceiver circuitry to determine that the communications device has uplink data to transmit to the wireless communications network, to construct an uplink signal comprising the uplink data by initialising one or more characteristics of the uplink signal, wherein the one or more characteristics of the uplink signal are associated with a reference value known to each of the communications device and the wireless communications network, and to transmit the uplink signal to the wireless communications network.

Paragraph 27. Circuitry for a communications device comprising transceiver circuitry configured to transmit signals to and/or to receive signals from a wireless communications network via a wireless access interface, and controller circuitry configured in combination with the transceiver circuitry to determine that the communications device has uplink data to transmit to the wireless communications network, to construct an uplink signal comprising the uplink data by initialising one or more characteristics of the uplink signal, wherein the one or more characteristics of the uplink signal are associated with a reference value known to each of the communications device and the wireless communications network, and to transmit the uplink signal to the wireless communications network.

Paragraph 28. A method of operating an infrastructure equipment forming part of a wireless communications network, the infrastructure equipment being configured to transmit signals to and/or to receive signals from a communications device via a wireless access interface, the method comprising receiving an uplink signal from the communications device, determining that the communications device constructed the uplink signal by initialising one or more characteristics of the uplink signal, wherein the one or more characteristics of the uplink signal are associated with a reference value known to each of the communications device and the infrastructure equipment, and decoding the uplink signal to recover uplink data in accordance with the one or more characteristics of the uplink signal.

Paragraph 29. A method according to Paragraph 28, wherein the wireless communications network is a non-terrestrial network, NTN, wherein the infrastructure equipment is a non-terrestrial infrastructure equipment forming part of the NTN, and wherein the method comprises providing a plurality of spot beams, at least one of the spot beams providing the wireless access interface for transmitting the signals to and/or receiving the signals from the communications device within a coverage region formed by the at least one of the spot beams.

Paragraph 30. A method according to Paragraph 28 or Paragraph 29, wherein the one or more characteristics of the uplink signal comprise at least one of a scrambling code, a property of a demodulation reference signal, DMRS, a frequency hopping pattern, whether the uplink signal is to be transmitted within reserved resources of the wireless access interface, whether the uplink signal is to be transmitted within invalid resources of the wireless access interface, and a transmission power.

Paragraph 31. A method according to any of Paragraphs 28 to 30, wherein the reference value refers to a sequence number of a reference time resource unit of the wireless access interface.

Paragraph 32. A method according to Paragraph 31, comprising transmitting an indication of a timing advance value to the communications device, the timing advance value defining an offset between the timings of downlink time resource units of the wireless access interface and uplink time resource units of the wireless access interface at the communications device, and determining the sequence number of the reference time resource unit based at least in part on the timing advance value.

Paragraph 33. A method according to Paragraph 31 or Paragraph 32, comprising transmitting an indication of the sequence number of the reference time resource unit to the communications device via a Radio Resource Control, RRC, configuration.

Paragraph 34. A method according to Paragraph 33, wherein the RRC configuration indicates the sequence number of the reference time resource unit as an offset with respect to an NTN offset value applied by the communications device for transmitting signals to the infrastructure equipment, wherein the NTN offset value defines a number of time resource units of the wireless access interface by which the communications device is to modify its timing with respect to a timing of the infrastructure equipment.

Paragraph 35. A method according to Paragraph 33 or Paragraph 34, wherein the RRC configuration indicates the sequence number of the reference time resource unit as an offset with respect to a terrestrial network, TN, offset value applied by the communications device for transmitting signals to the infrastructure equipment, wherein the TN offset value defines a number of time resource units of the wireless access interface from a first time resource unit in which a scheduling message is received by the communications device from the infrastructure equipment to a second time resource unit in which a signal scheduled by the scheduling message is to be transmitted by the communications device to the infrastructure equipment.

Paragraph 36. A method according to any of Paragraphs 33 to 35, comprising transmitting, to the communications device, a scheduling message indicating that the uplink signal is to be transmitted by the communications device to the infrastructure equipment, wherein the RRC configuration indicates the sequence number of the reference time resource unit with reference to a sequence number of a time resource unit of the wireless access interface in which the scheduling message is received by the communications device.

Paragraph 37. A method according to any of Paragraphs 33 to 36, wherein the RRC configuration indicates a number of consecutive sequence numbers of time resource units of the wireless access interface for which the communications device is to initialise the same characteristics when constructing uplink signals.

Paragraph 38. A method according to any of Paragraphs 33 to 37, wherein the sequence number indicated by the RRC configuration is dependent on the type of channel on which the uplink signal is transmitted.

Paragraph 39. A method according to any of Paragraphs 33 to 38, wherein the RRC configuration indicates a plurality of sequence numbers of candidate reference time resource units, wherein the method comprises transmitting, to the communications device, signalling indicating which of the candidate reference time resource units is the reference time resource unit with which the characteristics of the uplink signal to be constructed are associated.

Paragraph 40. A method according to any of Paragraphs 31 to 39, wherein the sequence number of the reference time resource unit is predetermined and known to both of the communications device and the infrastructure equipment.

Paragraph 41. A method according to any of Paragraphs 31 to 40, comprising transmitting an indication of the sequence number of the reference time resource unit to the infrastructure equipment via Medium Access Control, MAC, Control Element, CE, signalling.

Paragraph 42. A method according to Paragraph 41, wherein the MAC CE comprises a specific field which indicates the sequence number of the reference time resource unit.

Paragraph 43. A method according to Paragraph 41 or Paragraph 42, wherein the MAC CE implicitly indicates the sequence number of the reference time resource unit via a value of a different parameter to the sequence number of the reference time resource unit indicated by the MAC CE.

Paragraph 44. A method according to any of Paragraphs 31 to 43, comprising transmitting an indication of the sequence number of the reference time resource unit to the communications device via Downlink Control Information, DCI, signalling.

Paragraph 45. A method according to Paragraph 44, wherein the DCI comprises a bit field, wherein the sequence number of the reference time resource unit is dependent on a value indicated by the bit field.

Paragraph 46. A method according to Paragraph 44 or Paragraph 45, wherein the DCI implicitly indicates the sequence number of the reference time resource unit via a value of a different parameter to the sequence number of the reference time resource unit indicated by the DCI.

Paragraph 47. A method according to any of Paragraphs 31 to 46, comprising transmitting, to the communications device, a scheduling message indicating that the uplink signal is to be transmitted by the communications device to the infrastructure equipment, and wherein the sequence number of the reference time resource unit is dependent on a sequence number of a time resource unit of the wireless access interface in which the scheduling message is received by the communications device.

Paragraph 48. A method according to Paragraph 47, wherein the sequence number of the reference time resource unit is offset from the sequence number of the time resource unit of the wireless access interface in which the scheduling message is received by the communications device by either, in a first configuration, a predetermined amount or, in a second configuration, a combination of the predetermined amount and an NTN offset value applied by the communications device for transmitting signals to the infrastructure equipment, wherein the NTN offset value defines a number of time resource units of the wireless access interface by which the communications device is to modify its timing with respect to a timing of the infrastructure equipment.

Paragraph 49. A method according to Paragraph 48, wherein the infrastructure equipment determines that the communications device will determine the sequence number of the reference time resource unit in accordance with the first configuration or the second configuration in a predefined manner.

Paragraph 50. A method according to Paragraph 48 or Paragraph 49, comprising transmitting signalling to the communications device indicating whether the communications device is to determine the sequence number of the reference time resource unit in accordance with the first configuration or the second configuration.

Paragraph 51. A method according to any of Paragraphs 31 to 50, wherein the transmission of the uplink signal is a pre-configured uplink transmission within pre-configured resources of the wireless access interface, the pre-configured resources being located within one of a plurality of periodic transmission occasions.

Paragraph 52. A method according to Paragraph 51, comprising determining, in accordance with the sequence number of the reference time resource unit, within which of the plurality of periodic transmission occasions the uplink signal is to be transmitted by the communications device.

Paragraph 53. A method according to any of Paragraphs 28 to 52, wherein the reference value is an identifier associated with one of the communications device and a cell provided by the infrastructure equipment.

Paragraph 54. An infrastructure equipment comprising transceiver circuitry configured to transmit signals to and/or to receive signals from a communications device via a wireless access interface, and controller circuitry configured in combination with the transceiver circuitry to receive an uplink signal from the communications device, to determine that the communications device constructed the uplink signal by initialising one or more characteristics of the uplink signal, wherein the one or more characteristics of the uplink signal are associated with a reference value known to each of the communications device and the infrastructure equipment, and to decode the uplink signal to recover uplink data in accordance with the one or more characteristics of the uplink signal.

Paragraph 55. Circuitry for an infrastructure equipment comprising transceiver circuitry configured to transmit signals to and/or to receive signals from a communications device via a wireless access interface, and controller circuitry configured in combination with the transceiver circuitry to receive an uplink signal from the communications device, to determine that the communications device constructed the uplink signal by initialising one or more characteristics of the uplink signal, wherein the one or more characteristics of the uplink signal are associated with a reference value known to each of the communications device and the infrastructure equipment, and to decode the uplink signal to recover uplink data in accordance with the one or more characteristics of the uplink signal.

Paragraph 56. A communications system comprising a communications device according to Paragraph 26 and an infrastructure equipment according to Paragraph 54.

Paragraph 57. A computer program comprising instructions which, when loaded onto a computer, cause the computer to perform a method according to any of Paragraphs 1 to 25 or Paragraphs 28 to 53.

Paragraph 58. A non-transitory computer-readable storage medium storing a computer program according to Paragraph 57.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] TR 38.811 V15.4.0, “Study on New Radio (NR) to support non terrestrial networks (Release 15)”, 3rd Generation Partnership Project, October 2020.

[2] Holma H. and Toskala A, “LTE for UMTS OFDMA and SC-FDMA based radio access”, John Wiley and Sons, 2009.

[3] TR 38.821 V16.0.0, “Solutions for NR to support Non-Terrestrial Networks (NTN)” 3rd Generation Partnership Project, January 2020.

[4] RP-202908, “Solutions for NR to support non-terrestrial networks (NTN)”, Thales, RANP #90e, December 2020.

[5] RP-193235, “New Study WID on NB-IoT/eMTC support for NTN”, MediaTek Inc. RANP #86, December 2019.

[6] TS 36.211 V16.4.0, "Evolved Universal Terrestrial Radio Access (E-UTRA); Physical channels and modulation", 3rd Generation Partnership Project, January 2021.

What is claimed is:

1. A method of operating a communications device for transmitting signals to and/or receiving signals from a wireless communications network via a wireless access interface, the method comprising determining that the communications device has uplink data to transmit to the wireless communications network, constructing an uplink signal comprising the uplink data by applying, to the uplink data, one or more characteristics initialised based on a reference value that refers to a sequence number of a reference time resource unit of the wireless access interface and is known to each of the communications device and the wireless communications network, determining the sequence number of the reference time resource unit via a Radio Resource Control, RRC, configuration signalled by the wireless communications network, and transmitting the uplink signal to the wireless communications network, wherein the RRC configuration indicates the sequence number of the reference time resource unit as an offset with respect to an NTN offset value applied by the communications device for transmitting signals to the wireless communications network, wherein the NTN offset value defines a number of time resource units of the wireless access interface by which the communications device is to modify its timing with respect to a timing of the wireless communications network.

2. A method according to claim 1, wherein the wireless communications network is a non-terrestrial network, NTN, and wherein the transmitting the signals to and/or receiving the signals from the NTN comprises communicating with a non-terrestrial infrastructure equipment forming part of the NTN via at least one of a plurality of spot beams which provides the wireless access interface for transmitting the signals to and/or receiving the signals from the non-terrestrial infrastructure equipment within a coverage region formed by the at least one of the spot beams.

3. A method according to claim 1, wherein the one or more characteristics of the uplink signal comprise at least one of a scrambling code, a property of a demodulation reference signal, DMRS, a frequency hopping pattern, whether the uplink signal is to be transmitted within reserved resources of the wireless access interface, whether the uplink signal is to be transmitted within invalid resources of the wireless access interface, and a transmission power.

4. A method according to claim 1, wherein the RRC configuration indicates a number of consecutive sequence numbers of time resource units of the wireless access interface for which the communications device is to initialise the same characteristics when constructing uplink signals.

5. A method according to claim 1, wherein the sequence number indicated by the RRC configuration is dependent on the type of channel on which the uplink signal is transmitted.

6. A method according to claim 1, wherein the RRC configuration indicates a plurality of sequence numbers of candidate reference time resource units, wherein the method comprises receiving, from the wireless communications network, signalling indicating which of the candidate reference time resource units is the reference time resource unit with which the characteristics of the uplink signal to be constructed are associated.

7. A communications device comprising transceiver circuitry configured to transmit signals to and/or to receive signals from a wireless communications network via a wireless access interface, and controller circuitry configured in combination with the transceiver circuitry to determine that the communications device has uplink data to transmit to the wireless communications network, to construct an uplink signal comprising the uplink data by applying, to the uplink data, one or more characteristics initialised based on a reference value that refers to a sequence number of a reference time resource unit of the wireless access interface and is known to each of the communications device and the wireless communications network, to determine the sequence number of the reference time resource unit via a Radio Resource Control, RRC, configuration signalled by the wireless communications network, and to transmit the uplink signal to the wireless communications network, wherein the RRC configuration indicates the sequence number of the reference time resource unit as an offset with respect to an NTN offset value applied by the communications device for transmitting signals to the wireless communications network, wherein the NTN offset value defines a number of time resource units of the wireless access interface by which the communications device is to modify its timing with respect to a timing of the wireless communications network.

8. An infrastructure equipment comprising transceiver circuitry configured to transmit signals to and/or to receive signals from a communications device via a wireless access interface, and controller circuitry configured in combination with the transceiver circuitry to receive an uplink signal from the communications device, to determine that the communications device constructed the uplink signal by applying, to uplink data, one or more characteristics initialised based on a reference value that refers to a sequence number of a reference time resource unit of the wireless access interface and is known to each of the communications device and the infrastructure equipment, to transmit, to the communications device, a Radio Resource Control, RRC, configuration signalled by the infrastructure equipment, and to decode the uplink signal to recover the uplink data in accordance with the one or more characteristics of the uplink signal, wherein the RRC configuration indicates the sequence number of the reference time resource unit as an offset with respect to an NTN offset value applied by the communications device for transmitting signals to the infrastructure equipment, wherein the NTN offset value defines a number of time resource units of the wireless access interface by which the communications device is to modify its timing with respect to a timing of the infrastructure equipment.

* * * * *